United States Patent
Bratton et al.

(10) Patent No.: US 9,212,078 B2
(45) Date of Patent: Dec. 15, 2015

(54) VERTICAL I.S. MACHINE

(71) Applicant: Emhart Glass S.A., Cham (CH)

(72) Inventors: Kenneth L. Bratton, Avon, CT (US); F. Alan Fenton, Granby, CT (US); Matthew R. Hyre, St. Paul, MN (US); Paul Stargardter, Windsor, CT (US); Jonathon S. Simon, Pleasant Valley, CT (US); Stephen A. Austin, Somers, CT (US); Steven J. Pinkerton, Avon, CT (US)

(73) Assignee: Emhart Glass S.A., Cham (CH)

( * ) Notice: Subject to any disclaimer, the term of this patent is extended or adjusted under 35 U.S.C. 154(b) by 235 days.

(21) Appl. No.: 14/033,557

(22) Filed: Sep. 23, 2013

(65) Prior Publication Data
US 2014/0090420 A1 Apr. 3, 2014

Related U.S. Application Data

(60) Provisional application No. 61/708,923, filed on Oct. 2, 2012.

(51) Int. Cl.
*C03B 9/193* (2006.01)
*C03B 9/36* (2006.01)
*C03B 9/447* (2006.01)

(52) U.S. Cl.
CPC ............ *C03B 9/1932* (2013.01); *C03B 9/193* (2013.01); *C03B 9/3663* (2013.01); *C03B 9/447* (2013.01)

(58) Field of Classification Search
CPC ..................................... C03B 9/1932
USPC .................. 65/68, 79, 82, 216, 226
See application file for complete search history.

(56) References Cited

U.S. PATENT DOCUMENTS

| 1,678,233 | A | * | 7/1928 | Soubier | C03B 9/165 |
| | | | | | 65/225 |
| 1,825,082 | A | * | 9/1931 | McNish | C03B 9/22 |
| | | | | | 65/218 |
| 3,329,492 | A | * | 7/1967 | Kinsley | C03B 9/193 |
| | | | | | 65/223 |
| 3,434,820 | A | * | 3/1969 | Zappia et al. | 65/223 |
| 4,325,725 | A | * | 4/1982 | Fujimoto | 65/230 |
| 4,680,050 | A | * | 7/1987 | Doud | 65/79 |

* cited by examiner

Primary Examiner — Matthew Daniels
Assistant Examiner — Cynthia Szewczyk
(74) Attorney, Agent, or Firm — Reinhart Boerner Van Deuren s.c.

(57) ABSTRACT

A vertical individual section (I.S.) machine for manufacturing glass containers is disclosed in which parisons made in parison molds are lowered into blow molds located under the parison molds without being inverted, where they are blown into glass containers. Optionally, reheat shrouds may be located vertically intermediate the blank molds and the blow molds to reheat the parisons prior to them being blown. The vertical I.S. machine may have multiple sections that are located close adjacent each other, with each section potentially having multiple blank and blow molds.

21 Claims, 20 Drawing Sheets

VERTICAL I.S. MACHINE

IDENTIFICATION OF RELATED PATENT APPLICATION

This patent application claims priority of U.S. Provisional Patent Application No. 61/708,923, filed on Oct. 2, 2012, which is entitled "Vertical I.S. Machine," which patent application is hereby incorporated herein by reference in its entirety.

BACKGROUND OF THE INVENTION

Field of the Invention

The present invention relates generally to individual section (I.S.) machines for manufacturing glass containers, and more particularly to a vertical I.S. machine in which parisons made in parison molds are lowered into blow molds located under the parison molds without being inverted and are blown into glass containers.

Molten glass from a furnace is typically formed into glass containers in an efficient, large scale, commercial manufacturing process performed in an Individual Section ("I.S.") machine, which contains between five and twenty identical sections, each of which is capable of making one, two, three, or four containers simultaneously. A stream of molten glass is provided by a furnace from which the stream of molten glass flows. The molten glass stream is cut with a shearing mechanism into uniform segments of glass called "gobs," which fall by gravity and are guided through a gob distribution system of scoops, troughs, and deflectors into blank molds. In each of the blank molds, a pre-container referred to as a parison is formed, either by using a metal plunger to push the glass into the blank mold, or by blowing the glass from below into the blank mold. The hot parison is then inverted and transferred to a blow mold, where the parison is blown out into the shape of the container in the blow mold, where it is then cooled to the point where it is sufficiently rigid to be gripped and removed from the blow station.

All I.S. machines have from one to four blank molds and an equivalent number of blow molds located inline, with the blank molds being located at one side (the back side) of the section and all of the blow molds being located at the opposite side (the front side) of the section. Multiple sections are located closely adjacent to each other, with the linear array of blank molds and blow molds in each section being located in parallel fashion to the linear arrays of blank molds and blow molds in the other sections. Such I.S. machines thus enable efficient production by allowing an operator to take one or more sections out of production for repairs without having to shut down production in the other sections.

The operation of each section begins with glass gobs being dropped into the blank molds, a baffle being placed on top of the blank molds, and the glass gobs being blown into parisons, which are upside down. The baffles are removed, the blank mold halves are opened, and all of the parisons in the section are swung through a 180 degree arc by a neckring arm to both invert them and move to the locations of the blow molds, where they are blown into glass containers which are then removed from the section and placed onto conveyers which remove them from the I.S. machine. This transfer of the parisons from the blank molds to the blow molds by the neckring arm puts stress on the hot parison, and can result in parison deformities which result in defective glass containers being produced in the blow molds.

Thus, it will be appreciated that while existing I.S. machines present many advantages, the blank molds, the parison transfer mechanism that moves the parisons from the blank molds to the blow molds, and the blow molds themselves are all located in the horizontal plane. At present, the design of such I.S. machines have been optimized to the greatest degree possible, with their speed being limited by the necessity of moving the parisons from the blank molds to the blow molds and inverting them through the 180 degree arc. If this transfer occurs too rapidly, the parisons will tend to bend during the transfer, resulting in wholesale rejections of the resulting blown glass containers. (This is particularly true of the outer parison, since it will travel the furthest as well as experience the greatest acceleration.)

It would accordingly be desirable to further optimize the design of I.S. machines to eliminate the need to invert the parisons between the blank molds and the blow molds. It would also be desirable to reduce the footprint of I.S. machines to a smaller area for a variety of reasons. It would also be desirable that all of the aforesaid advantages be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a vertical individual section (I.S.) machine for manufacturing glass containers is disclosed in which parisons made in parison molds are lowered into blow molds located under the parison molds without the necessity of inverting the parisons, and the parisons are blown into glass containers in the blow molds. Optionally, the parisons may be reheated in reheat shrouds located vertically intermediate the blank molds and the blow molds. Each section may have multiple blank and blow molds, and multiple sections may be located close adjacent each other, with the vertical I.S. machine of the present invention being considerably more compact than a conventional I.S. machine.

In a first apparatus embodiment of the present invention, a vertical I.S. machine comprises: at least one blank mold; a gob delivery mechanism for delivering a gob of molten glass to the at least one blank mold; at least one plunger for removable insertion into the at least one blank mold to form a parison in the at least one blank mold; at least one blow mold located below the at least one blank mold; a transfer mechanism to lower the parison formed in the at least one blank mold to convey it to the at least one blow mold; a blow head for removable placement onto the at least one blow mold to blow the parison into a glass container; and a takeout mechanism to remove the glass container from the blow mold.

In a second apparatus embodiment of the present invention, a vertical I.S. machine comprises: at least one blank mold; a gob delivery mechanism for delivering a gob of molten glass to the at least one blank mold; at least one plunger for removable insertion into the at least one blank mold to form a parison in the at least one blank mold from the gob of molten glass; at least one reheat shroud located below the at least one blank mold; a first transfer mechanism to lower the parison formed in the at least one blank mold to the at least one reheat shroud; at least one blow mold located below the at least one reheat shroud; a second transfer mechanism to lower the parison from the at least one reheat shroud to convey it to the at least one blow mold; a blow head for removable placement onto the at least one blow mold to blow the parison into a glass container; and a takeout mechanism to remove the glass container from the blow mold.

In a third apparatus embodiment of the present invention, a vertical I.S. machine comprises: a blank mold; a gob delivery mechanism for delivering a gob of molten glass to the blank mold; a plunger arranged and configured to form a parison in the blank mold; a blow mold located substantially below the blank mold; a transfer mechanism to lower the parison formed in the blank mold to the blow mold; a blow head to blow the parison into a glass container in the blow mold; and a takeout mechanism to remove the glass container from the blow mold.

In a method embodiment of the present invention, the following steps are performed in a vertical I.S. machine: a gob of molten glass is delivered to at least one blank mold; a plunger is removably inserted into the at least one blank mold to form a parison in the at least one blank mold from the gob of molten glass; the parison formed in the at least one blank mold is lowered into at least one blow mold located below the at least one blank mold; the parison is blown into a glass container with a blow head removably placed onto the at least one blow mold; and the glass container is removed from the blow mold with a takeout mechanism.

The vertical I.S. machine of the present invention provides an apparatus and method in which parisons made in parison molds are lowered into blow molds located under the parison molds without being inverted and are blown into glass containers. The vertical I.S. machine apparatus and method of the present invention eliminates the need to invert the parisons between the blank molds and the blow molds. The vertical I.S. machine apparatus and method of the present invention also reduces the footprint of I.S. machines to a smaller area for a variety of reasons. Finally, the vertical I.S. machine apparatus and method of the present invention achieves numerous advantages without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENT

An exemplary embodiment of the vertical I.S. machine of the present invention will be shown and its operation discussed herein. It will be understood that multiple vertical I.S. machine sections may be located in close proximity, which will facilitate a compact glass gob distribution system which can feed multiple vertical I.S. machine sections. The description that follows will focus primarily on a single vertical I.S. machine section, it being understood that multiple vertical I.S. machine sections will operate in the same manner.

Figure 1:
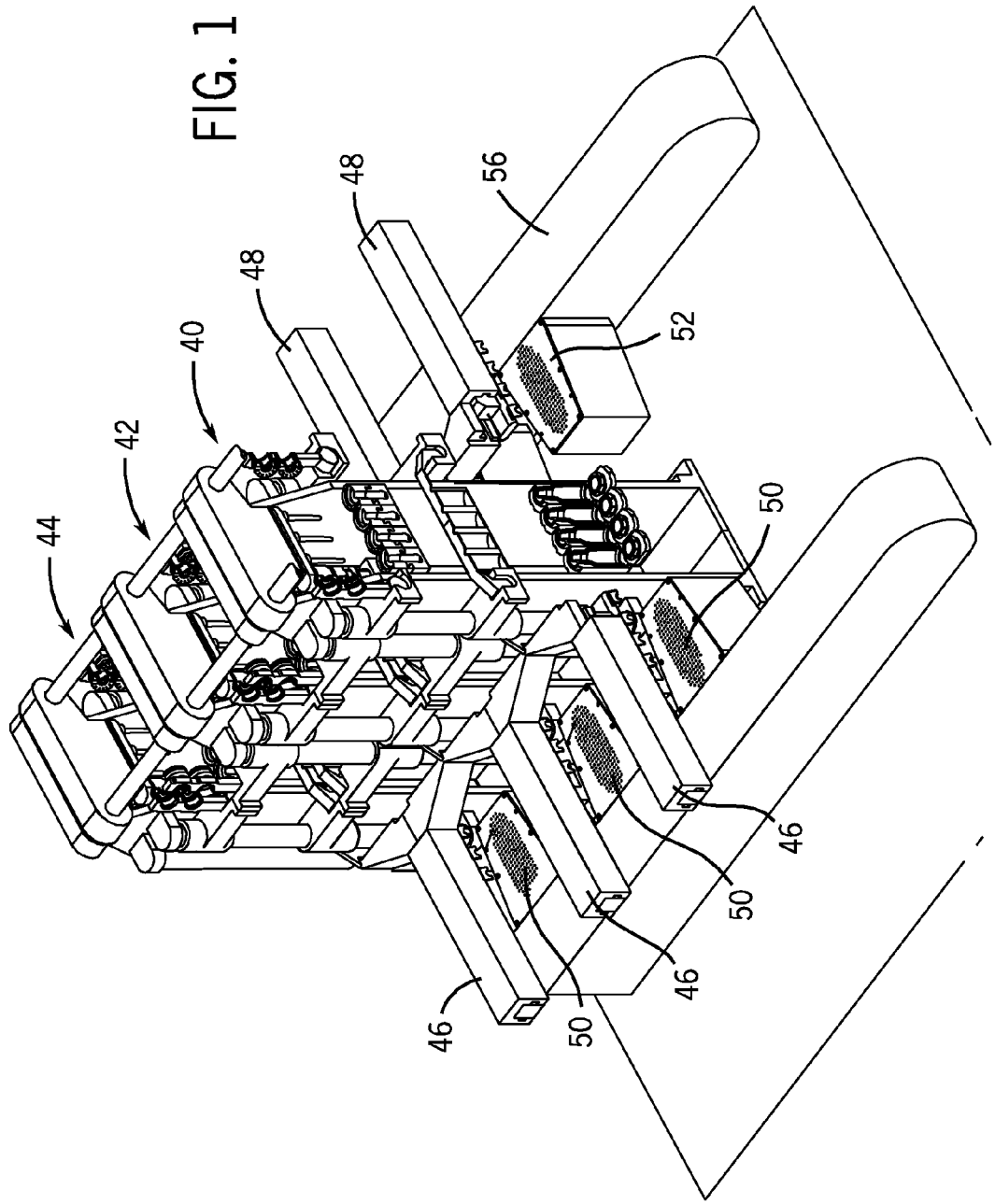
FIG. 1 is a somewhat schematic isometric view of a three-section, four mold per section, vertical I.S. machine with half of the first section removed for clarity.
Figure 2:
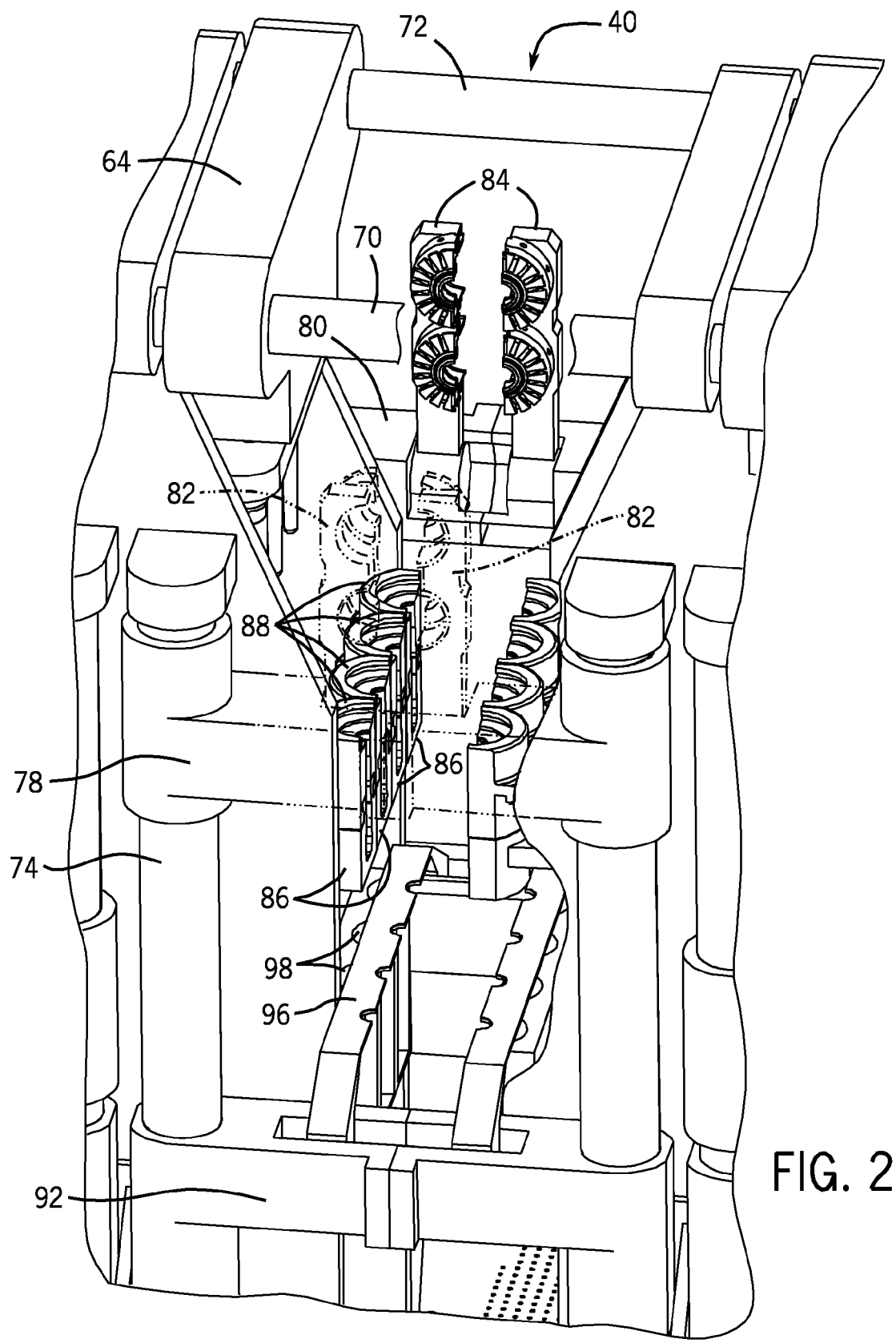
FIG. 2 is a partial elevated side view showing the upper portion of the third section of the vertical I.S. machine shown in FIG. 1.

Referring first to FIGS. 1 and 2, three sections 40, 42, and 44 of the vertical I.S. machine of the present invention are shown, with half of the vertical I.S. machine section 40 being omitted in FIG. 1 for clarity (the upper portion of the entire vertical I.S. machine section 40 is illustrated in FIG. 2). Each of the three sections 40, 42, and 44 of the vertical I.S. machine has four parison molds and four blow molds, as will be discussed in detail below in conjunction with subsequent figures. Referring primarily to FIG. 1, each section 40, 42, and 44 of the vertical I.S. machine has a pair of blow head support members 46 and 48 respectively mounted on opposite sides of the vertical I.S. machine sections 40, 42, and 44, intermediate the halves of each vertical I.S. machine section 40, 42, and 44.

Still referring to FIG. 1, the blow head support members 46 are respectively located over deadplates 50, and the blow head support members 48 are respectively located over deadplates 52. The deadplates 50 are each located adjacent a conveyor 54, and the deadplates 52 are each located adjacent a conveyor 56. Although they are not shown in FIG. 1, those skilled in the art will understand that a pusher arm will be located adjacent each of the deadplates 50 and 52 to push blown glass containers located on the deadplates 50 and 52 onto the conveyors 54 and 56, respectively.

Figure 3:
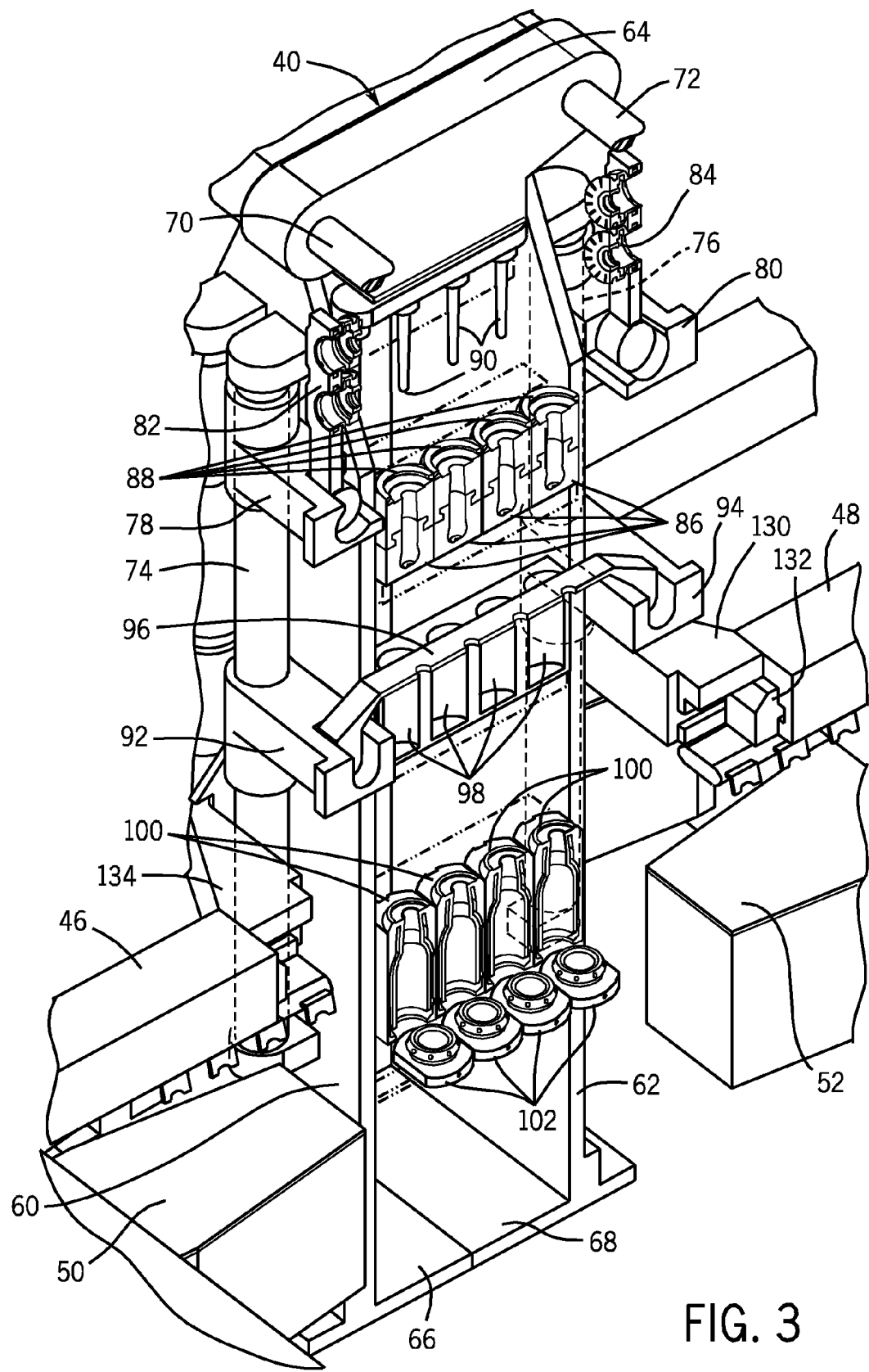
FIG. 3 is an isometric view of the half of the third section of the vertical I.S. machine shown in FIG. 1, shown in a beginning of cycle position.

Referring next to FIGS. 2 and 3, it will be appreciated that the vertical I.S. machine section 40 (as well as all of the other vertical I.S. machine sections) has two facing halves that are essentially mirror images of each other. For this reason, the details of the components of the vertical I.S. machine section 40 and its operation will be described with respect to one half of the vertical I.S. machine section 40, it being understood by those skilled in the art that in order for the vertical I.S. machine section 40 to operate, both halves are necessary and operate together. FIG. 3 and the following drawings will detail the components of the vertical I.S. machine section 40 and their interaction as they are used to manufacture a glass container from a gob of molten glass.

Referring now to FIG. 3, the components of half of the vertical I.S. machine section 40 will be described in brief detail. With respect to the components of the vertical I.S. machine section 40, their capability for movement will be described, although the operating mechanisms operating these components are not shown or described in any detail. The vertical I.S. machine section 40 half has section frame members 60 and 62 on opposite sides, with a section header 64 located on top of the frame members 60 and 62. The frame members 60 and 62 have bases 66 and 68, respectively, located at the bottoms thereof to secure the vertical I.S. machine section 40 half to a floor. The vertical I.S. machine section 40 halves and other sections are respectively aligned at their tops by a pair of section alignment tubes 70 and 72 which extend through opposite sides of the section header 64.

Mounted on the outer (non-facing) sides of the frame members 60 and 62 are two vertical support posts 74 and 76, respectively. Mounted on the support posts 74 and 76 are two neck ring operating mechanisms 78 and 80, respectively, which may be simultaneously and selectively driven between a position near the top of the support posts 74 and 76 (as shown in FIG. 3) and a position near the middle of the support posts 74 and 76.

Mounted on the neck ring operating mechanisms 78 and 80 are two neck ring arm halves 82 and 84, respectively. The neck ring arm halves 82 and are mounted at their proximal ends onto the neck ring operating mechanisms 78 and 80, respectively. The distal ends of the neck ring arm halves 82 and 84 each have two neck ring halves mounted thereon. The neck ring arm halves 82 and 84 are each selectively driven by the neck ring operating mechanisms 78 and 80, respectively, between a retracted position (nearer the vertical support post 74 and 76, as shown in FIG. 3) and an extended position (further from the vertical support post 74 and 76). The neck ring arm halves 82 and 84 are each also selectively driven by the neck ring operating mechanisms 78 and 80, respectively, to rotate between a vertical position (as shown in FIG. 3) and a horizontal position in which the distal ends of the neck ring arm halves 82 and 84 are adjacent each other.

Located between the section frame members 60 and 62 at a level just below the position of the proximal ends of the neck ring arm halves 82 and 84 are four parison molds, each of which consists of a parison bottom mold half 86 and a parison top mold half 88. The parison bottom mold halves 86 are selectively driven between a retracted position (as shown in FIG. 3) and an extended position, and the parison top mold halves 88 are also selectively driven between a retracted position (as shown in FIG. 3) and an extended position.

Located between the section frame members 60 and 62 at a level near the tops of the section frame members 60 and 62 are four plungers 90 (three are visible in FIG. 3), which are each selectively driven between a retracted position (retracted between the section frame members 60 and 62, as shown in FIG. 3) and an extended position (extending outwardly beyond the section frame members 60 and 62). The four plungers 90 are each also selectively driven between a raised position (as shown in FIG. 3) and a lowered position in which the plungers 90 extend into the parison top mold half 88 and the parison bottom mold half 86.

Also mounted on the support posts 74 and 76 are finish support operating mechanisms 92 and 94, respectively, which may be simultaneously and selectively driven between a position near the middle of the support posts 74 and 76 (as shown in FIG. 3) and a position near the bottom of the support posts 74 and 76. Mounted on the finish support operating mechanisms 92 and 94 and extending therebetween is a finish support arm half 96. The finish support arm half 96 is mounted at its opposite ends onto the finish support operating mechanisms 92 and 94. The finish support arm half 96 is selectively driven by the finish support operating mechanisms 92 and 94 between a retracted position (nearer the vertical support post 74 and 76, as shown in FIG. 3) and an extended position (further from the vertical support post 74 and 76). It may be noted that the finish support arm half 96 has four semi-circular openings in the central portion thereof.

Located between the section frame members 60 and 62 at a level just below the position of the central portion of the finish support arm half 96 are four cylindrical reheat container halves 98 that are open at the tops thereof and closed at the bottom ends thereof. The cylindrical reheat container halves 98 are selectively driven between a retracted position (as shown in FIG. 3) and an extended position.

Located between the section frame members 60 and 62 at a level just above the top surfaces of the deadplates 50 and 52 are four blow molds 100. The blow molds 100 are selectively driven between a retracted position (as shown in FIG. 3) and an extended position. Located at a level adjacent the bottoms of the four blow molds 100 are four blow mold bases 102 that will be engaged by the bottoms of the blow molds 100 when they are in their extended position.

The construction and operation of the blow head support members 46 and 48 will be discussed in further detail in conjunction with FIGS. 15 through 20.

Figure 4:
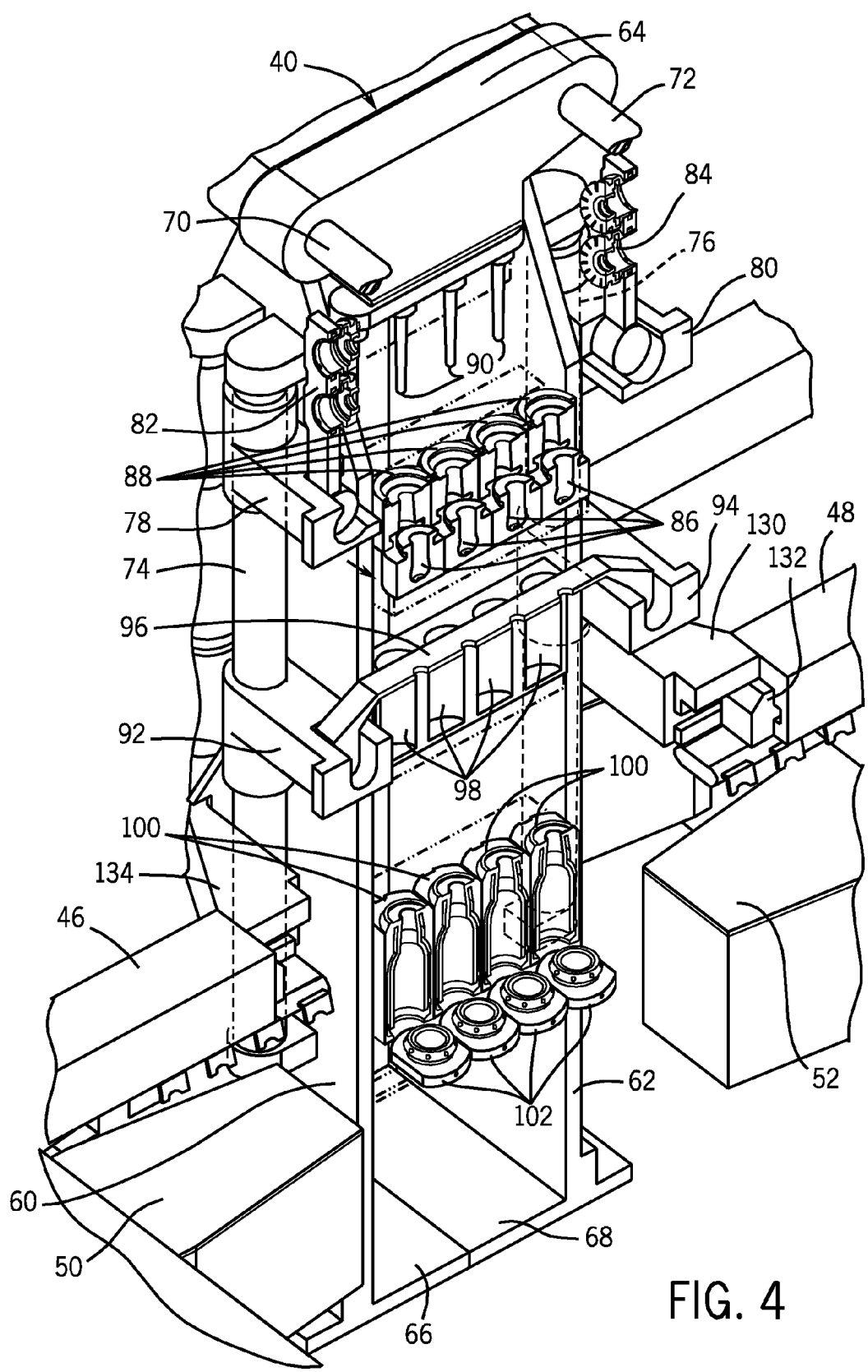
FIG. 4 is an isometric view of the half of the third section of the vertical I.S. machine shown in FIG. 3, with the parison bottom mold halves extended to form the bottom half of four parison molds.

A single cycle of the operation of the vertical I.S. machine of the present invention begins with the various components of the vertical I.S. machine in the positions in which they are shown in FIG. 3. In this position, the vertical I.S. machine is ready to begin a cycle. Referring next to FIG. 4, the four parison bottom mold halves 86 are driven from their retracted position to their extended position. In this position, the parison bottom mold halves 86 from the section half shown in FIG. 4 will be in contact with the parison bottom mold halves 86 from the other section half (shown in FIG. 2) to form the bottom halves of the four parison molds.

Figure 5:
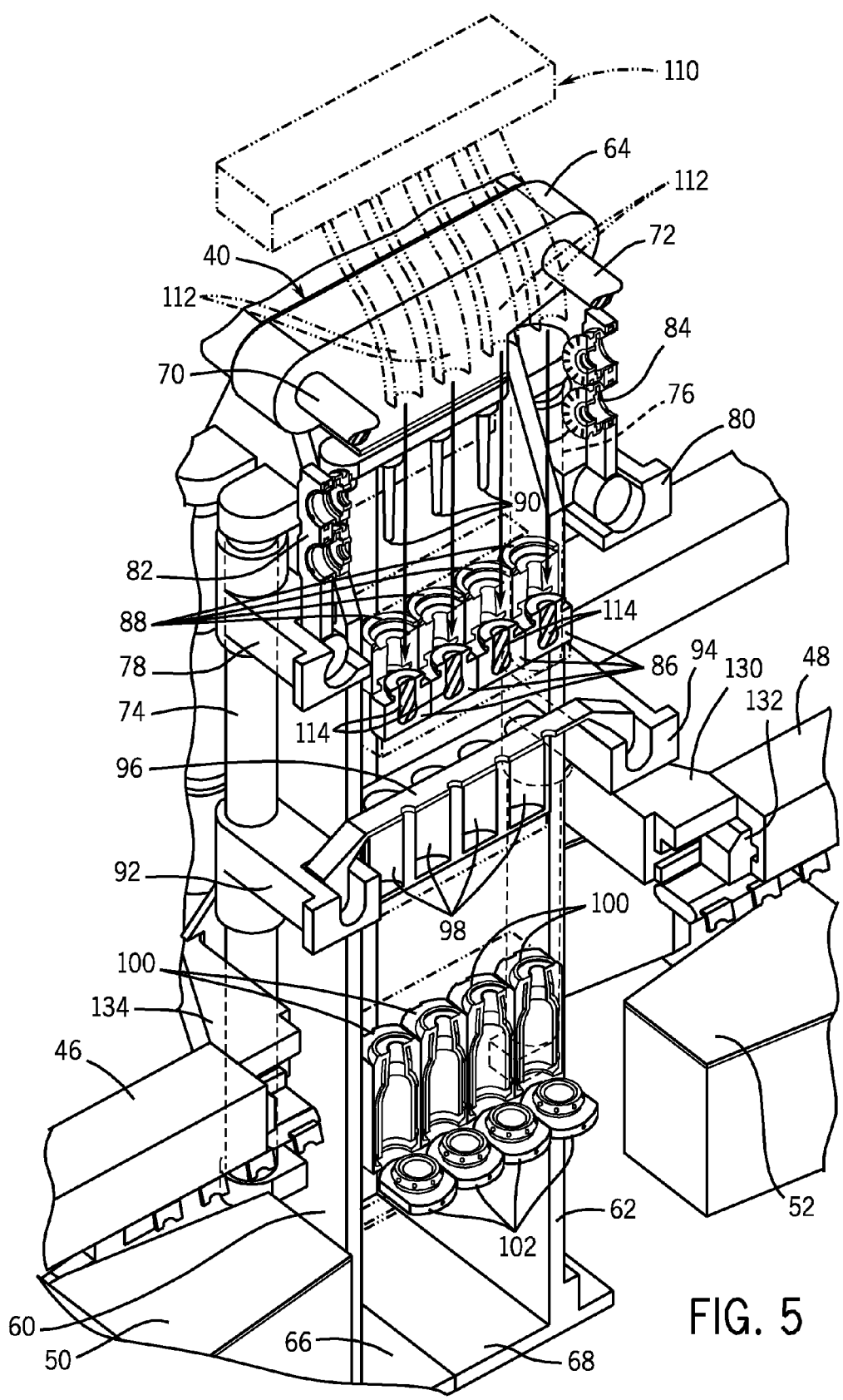
FIG. 5 is an isometric view of the half of the third section of the vertical I.S. machine shown in FIG. 4, with glass gobs dropped into the bottom halves of the parison molds.
Figure 6:
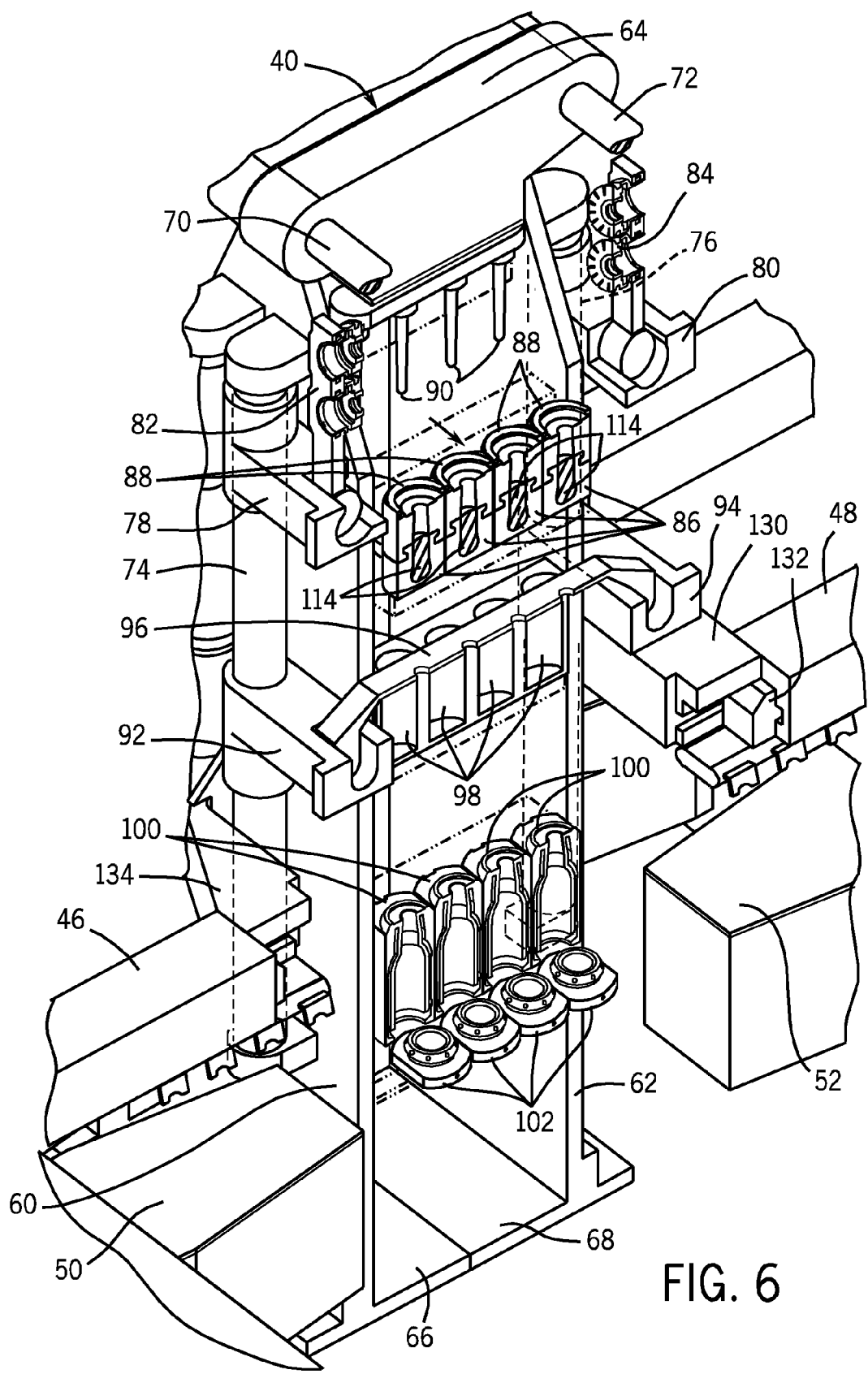
FIG. 6 is an isometric view of the half of the third section of the vertical I.S. machine shown in FIG. 5, with the top halves of the parison molds extended to form the top halves of the parison molds.

Referring then to FIG. 5, a glass gob feeder apparatus 110 having a plurality of glass gob delivery channels 112 (each typically consisting of a scoop, a trough, and a deflector) delivers a glass gob 114 to each of the four parison molds (each formed by a pair of parison bottom mold halves 86). Referring now to FIG. 6, the parison bottom mold halves 88 are driven from their retracted position to their extended position. In this position, the parison bottom mold halves 88 from the section half shown in FIG. 4 will be in contact with the parison bottom mold halves 88 from the other section half (shown in FIG. 2) to form the top halves of the four parison molds. Thus, the glass gobs 114 will be contained in four complete parison molds.

Figure 7:
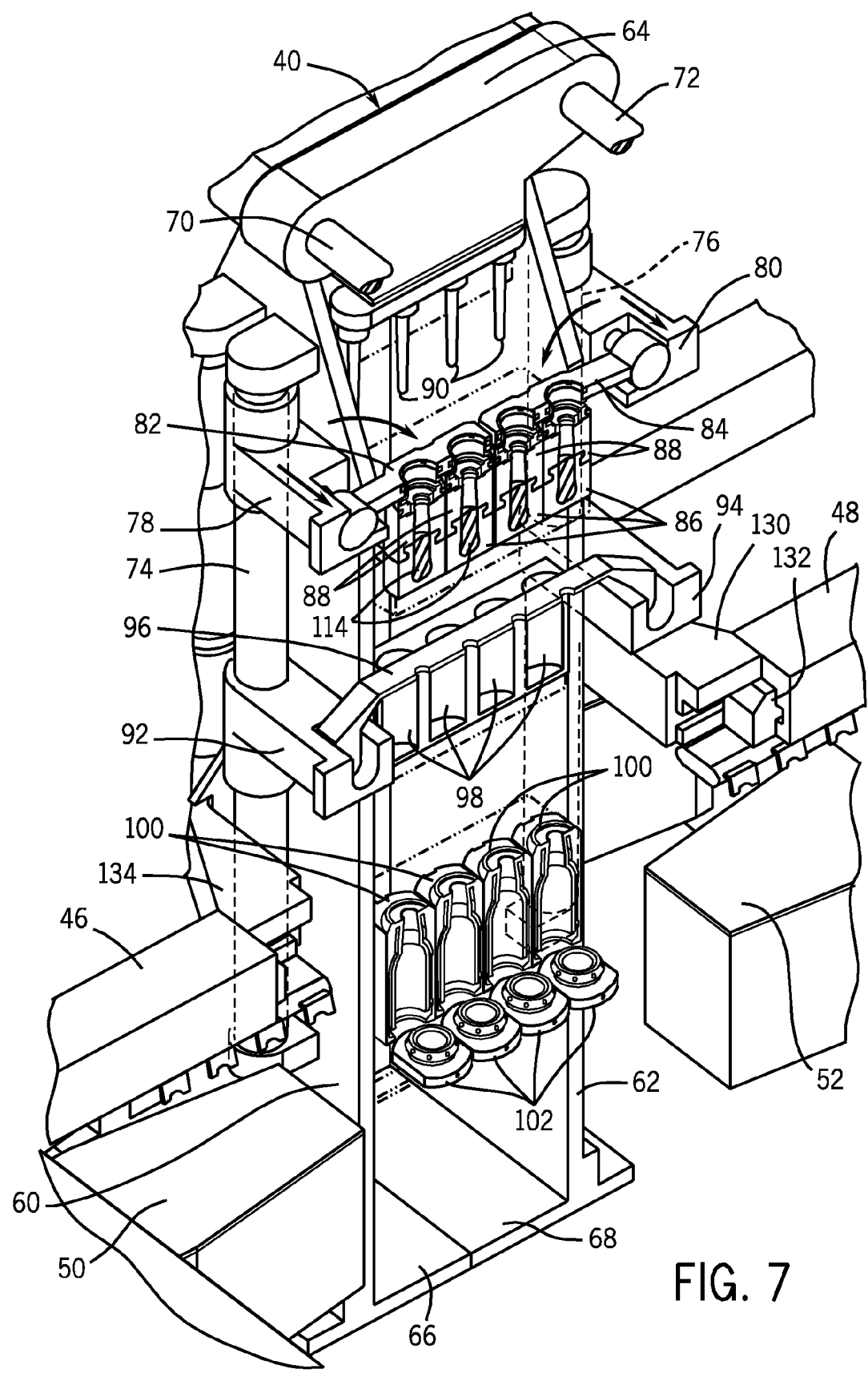
FIG. 7 is an isometric view of the half of the third section of the vertical I.S. machine shown in FIG. 6, with the neck ring arm halves pivoted inwardly and downwardly into position for molding.

Referring next to FIG. 7, it may be seen that the neck ring arm halves 82 and 84 have both driven from their retracted position to their extended position, and also rotated from their vertical position to their horizontal position. In this position, the two neck ring halves at the distal ends of each of the neck ring arm halves 82 and 84 are respectively located on top of the four parison molds.

Figure 8:
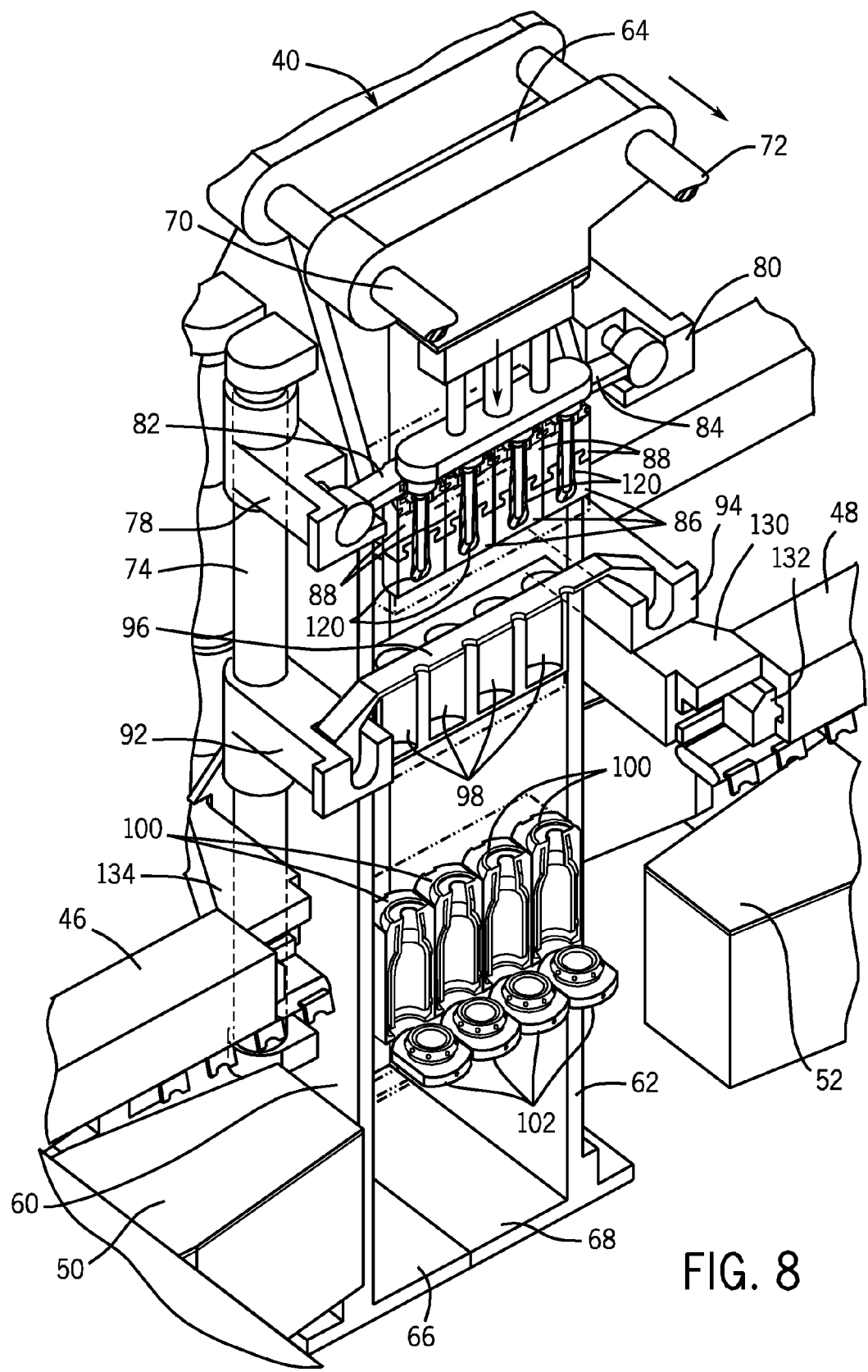
FIG. 8 is an isometric view of the half of the third section of the vertical I.S. machine shown in FIG. 7, with the plungers having been extended and then lowered to press and produce a finished parison.

Referring then to FIG. 8, it may be seen that the four plungers 90 are driven from their retracted position to their extended position, and then also driven from their raised position to their lowered position, with the four plungers 90 being driven into the four parison molds (which consist of the parison top mold halves 88 and the parison bottom mold halves 86, thereby forming each of the glass gobs 114 into a parison 120.

Figure 9:
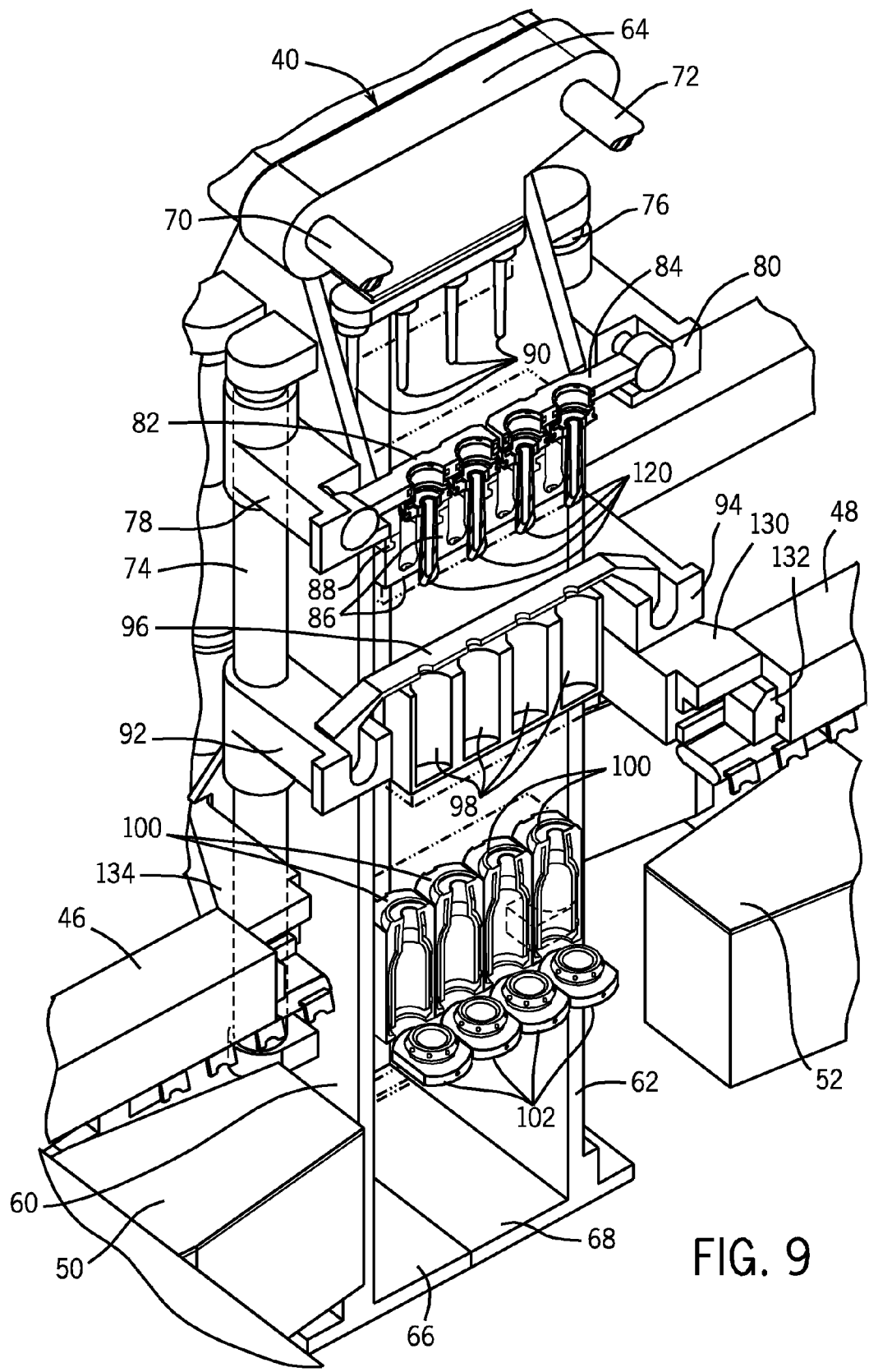
FIG. 9 is an isometric view of the half of the third section of the vertical I.S. machine shown in FIG. 8, with the plungers having been raised and then retracted, and with the top and bottom halves of the parison molds having been retracted.

Referring now to FIG. 9, it may be seen that the four plungers 90 are driven from their lowered position to their raised position, and then also from their extended position to their retracted position, leaving the four parisons 120 in the four parison molds. Simultaneously, it may be seen that the parison top mold halves 88 and the parison bottom mold halves 86 have been driven from their extended position to their retracted position, leaving the parisons 120 supported by their finishes from the neck ring arm halves 82 and 84.

Figure 10:
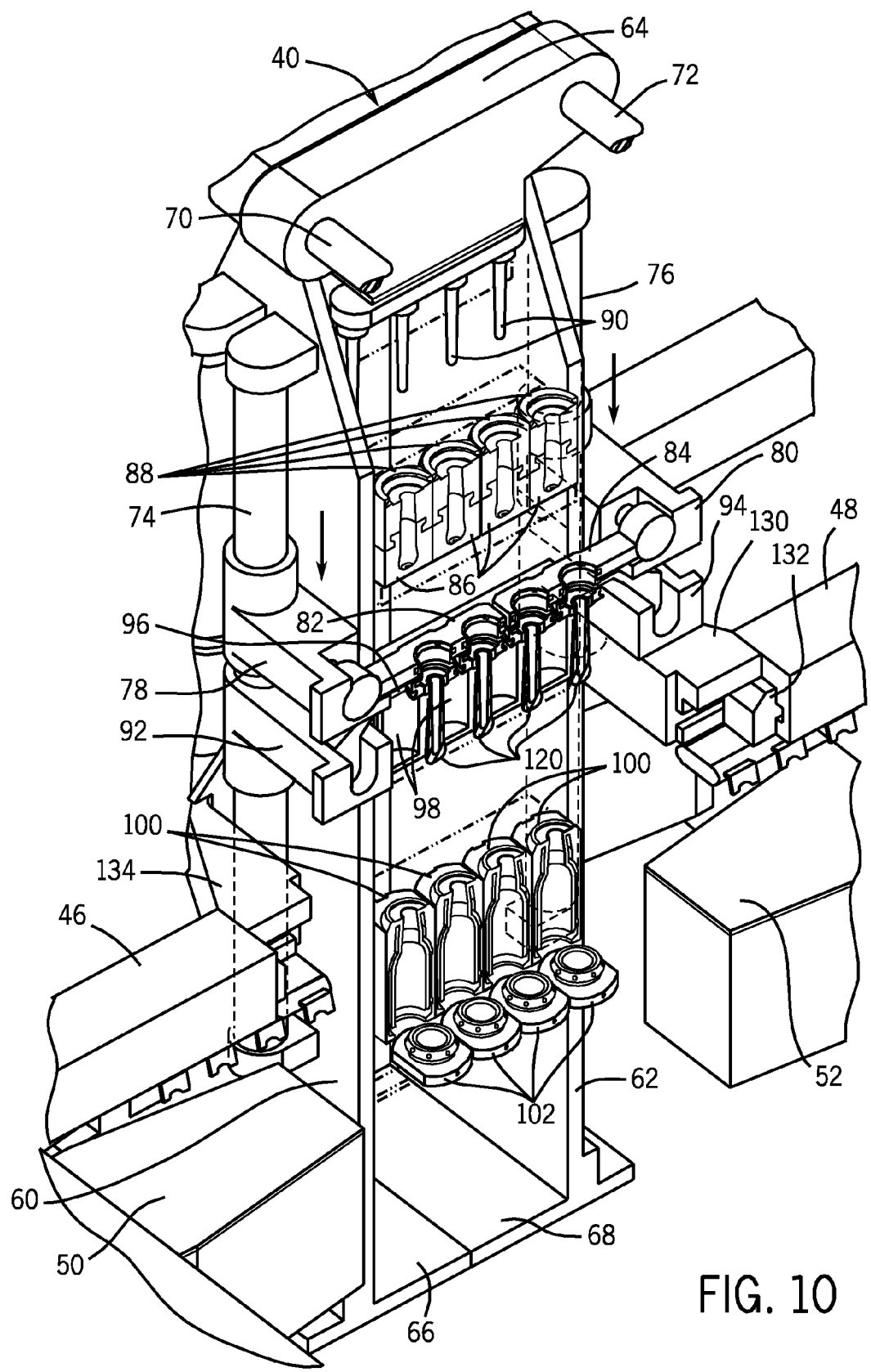
FIG. 10 is an isometric view of the half of the third section of the vertical I.S. machine shown in FIG. 9, with the neck ring arm halves having lowered the parisons to a reheat position.
Figure 11:
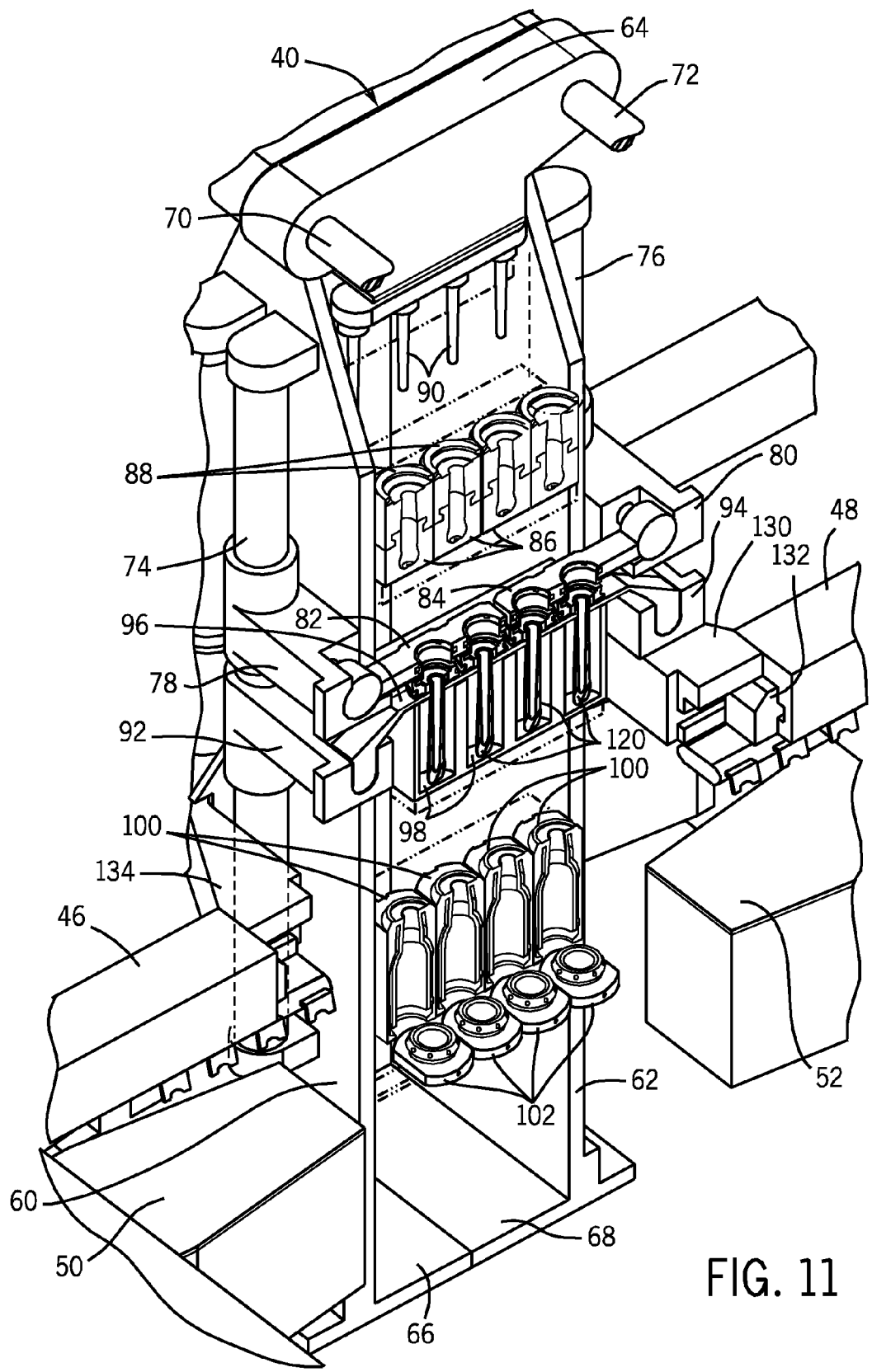
FIG. 11 is an isometric view of the half of the third section of the vertical I.S. machine shown in FIG. 10, with the reheat container halves having been extended to enclose all but the finishes of the parisons, and with the finish support arm halves having been extended to support the parisons at the finishes.

Referring next to FIG. 10, it may be seen that the neck ring operating mechanisms 78 and 80 have been driven from their position near the top of the support posts 74 and 76, respectively, to their position near the middle of the support posts 74 and 76, respectively, thereby lowering the neck ring arm half 82 and 84 and the four parisons 120 into a position lateral with the reheat container halves 98. Referring next to FIG. 11, it may be seen that the cylindrical reheat container halves 98 have been driven from their retracted position to their extended position, enclosing all of the four parisons 120 except for the finishes, which are supported by the neck ring operating mechanisms 78 and 80. The finish support arm halves 96 have also been driven from their retracted positions to their extended positions, with the finish support arm halves 96 also engaging the finishes of the parisons 120 just below the neck ring operating mechanisms 78 and 80.

The parisons 120 are allowed to reheat inside the cylindrical reheat container halves 98. It should be noted that the cylindrical reheat container halves 98 in the vertical I.S. machine of the present invention is optional. Instead of lowering the parisons 120 from the position of the parison molds to the position of the reheat containers, and then from the position of the reheat containers to the position of the blow molds, the reheat containers may be omitted from the vertical I.S. machine and the parisons 120 may instead be lowered directly from the position of the parison molds to the position of the blow molds, and allowed to reheat in the blow molds prior to being blown into glass containers. However, the use of the reheat containers potentially allows the speed of the cycle to be increased.

Figure 12:
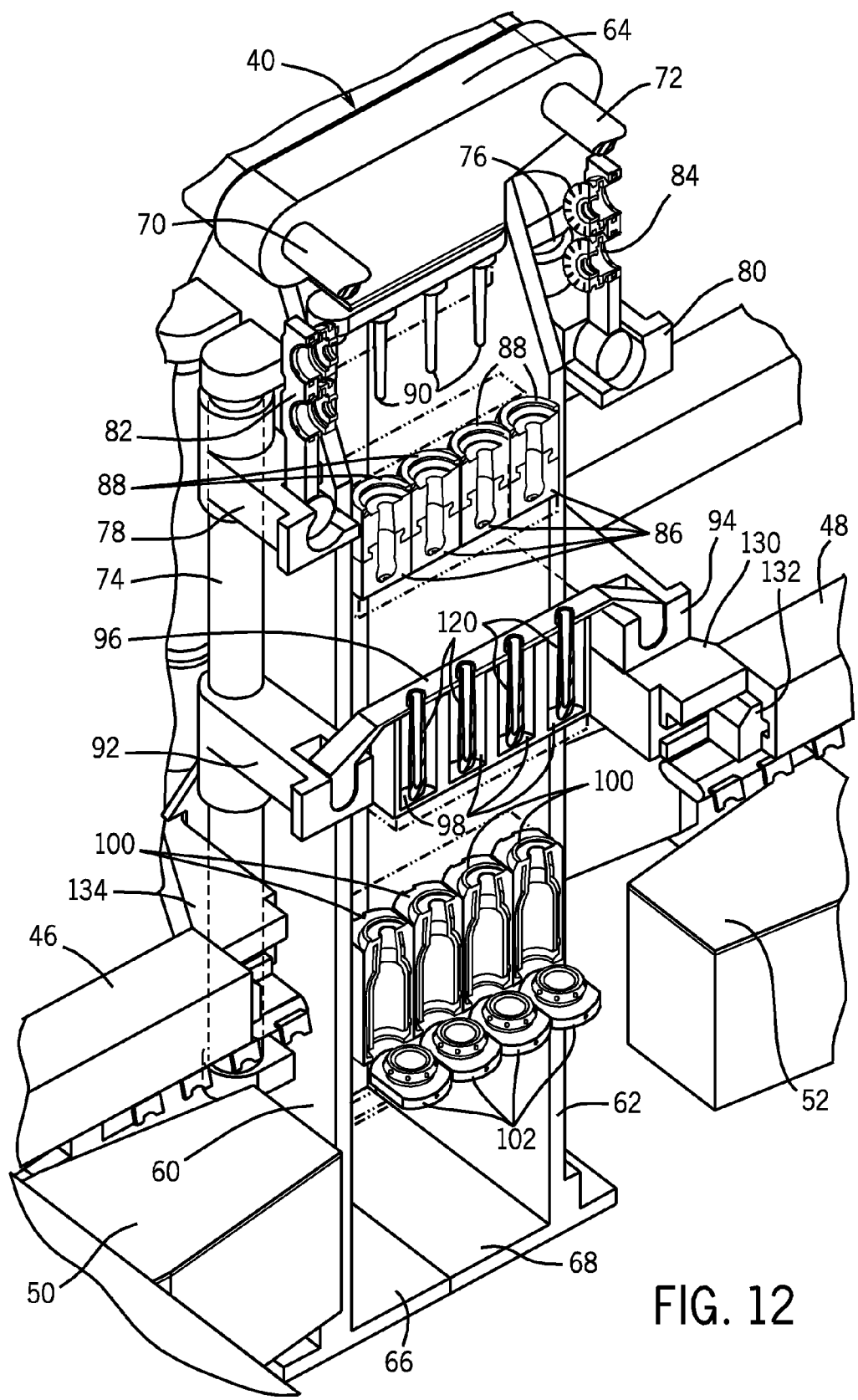
FIG. 12 is an isometric view of the half of the third section of the vertical I.S. machine shown in FIG. 11, with the neck ring arm halves having been retracted, raised, and pivoted outwardly, and with the parisons reheating.

Referring then to FIG. 12, it may be seen that the neck ring arm halves 82 and 84 have been retracted slightly to disengage them from the reheated parisons 120, and then the neck ring operating mechanisms 78 and 80 have been driven from their position near the middle of the support posts 74 and 76, respectively, to their position near the top of the support posts 74 and 76, respectively, and also rotated from their horizontal position to their vertical position. The neck ring arm halves 82 and 84 are them retracted to their fully retracted positions.

Figure 13:
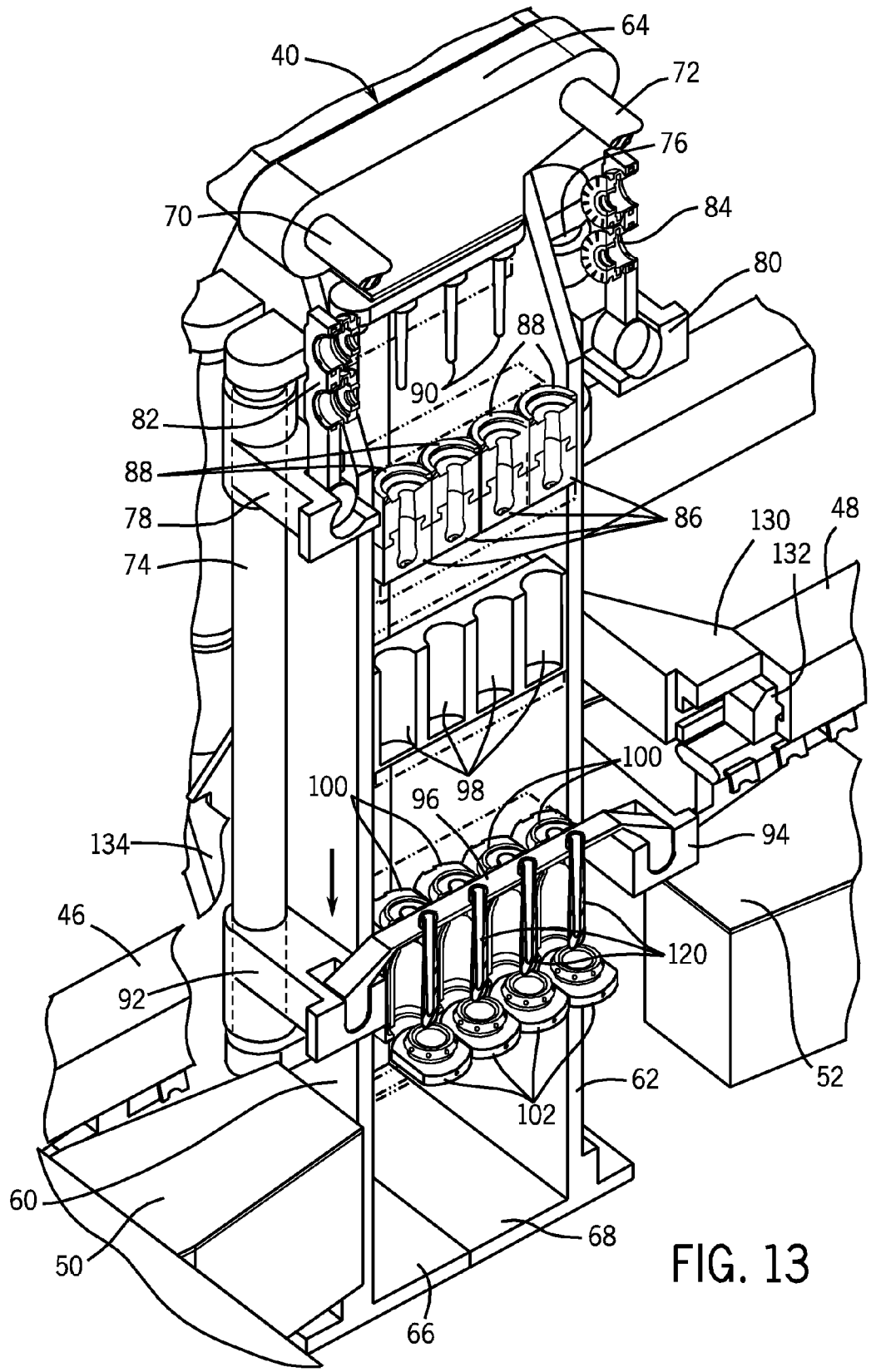
FIG. 13 is an isometric view of the half of the third section of the vertical I.S. machine shown in FIG. 12, with the reheat container halves having been retracted, and with the finish support arm halves having lowered the parisons to the blow position.

Referring now to FIG. 13, the cylindrical reheat container halves 98 have been driven from their extended position to their retracted position.

Immediately thereafter, the finish support operating mechanisms 92 and the finish support operating mechanism 94 are driven between their position near the middle of the support posts 74 and 76 to their position near the bottom of the support posts 74 and 76, respectively, thereby lowering the finish support arm halves 96 and the reheated parisons 120 into a position lateral with the blow molds 100.

Figure 14:
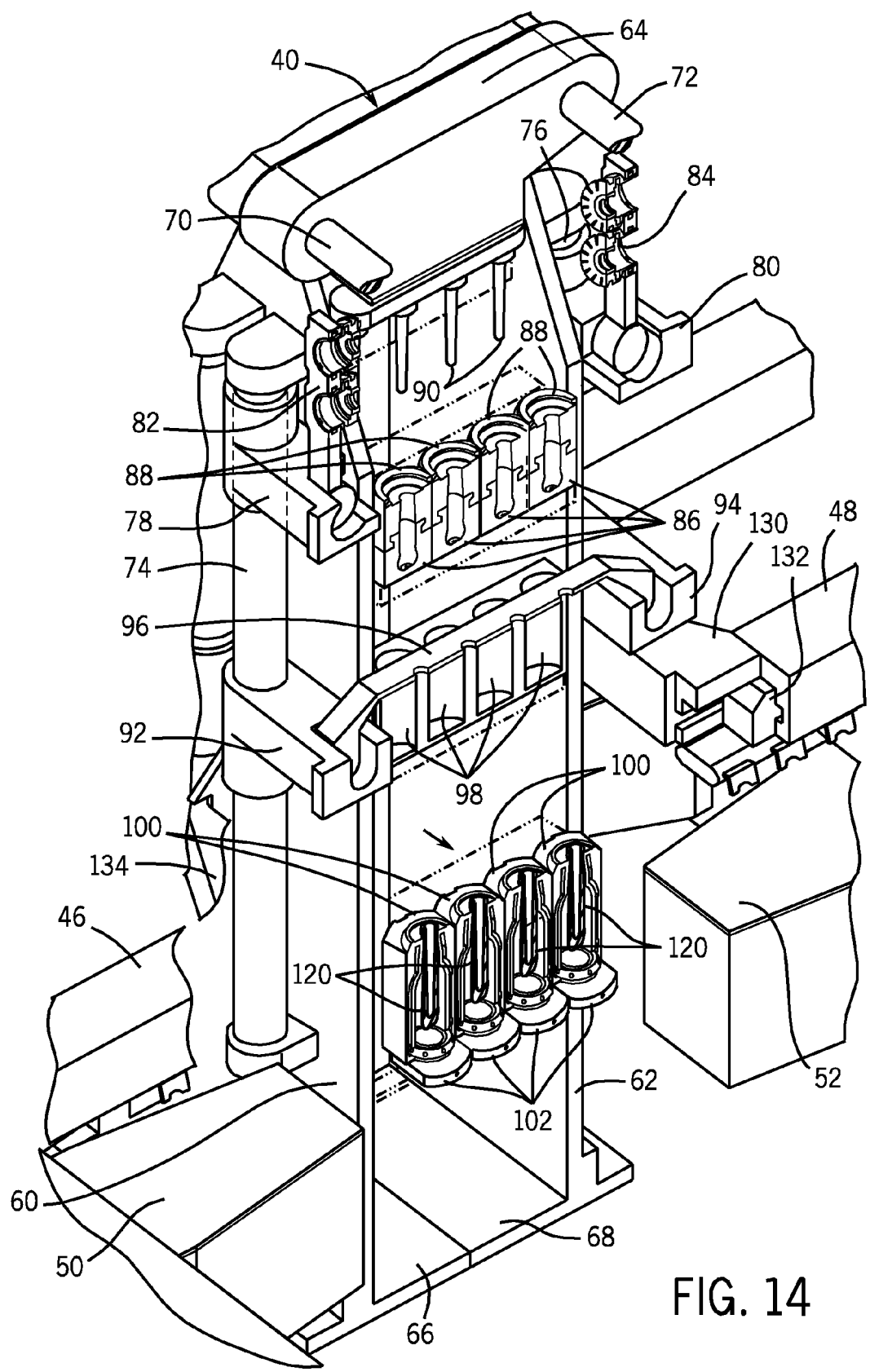
FIG. 14 is an isometric view of the half of the third section of the vertical I.S. machine shown in FIG. 13, with the blow mold halves having extended to engage fixed blow mold bases and the parisons, and with the finish support arm halves having been retracted and raised.

Referring next to FIG. 14, the blow molds 100 are driven from their retracted position into their extended position, enclosing the reheated parisons 120. It may be seen that the finish support arm half 96 has been retracted slightly to disengage it from the reheated parisons 120, and then the finish support operating mechanism 92 and 94 have been driven from their position near the bottom of the support posts 74 and 76, respectively, to their position near the middle of the support posts 74 and 76, respectively. The finish support arm half 96 is then retracted to its fully retracted position.

Figure 15:
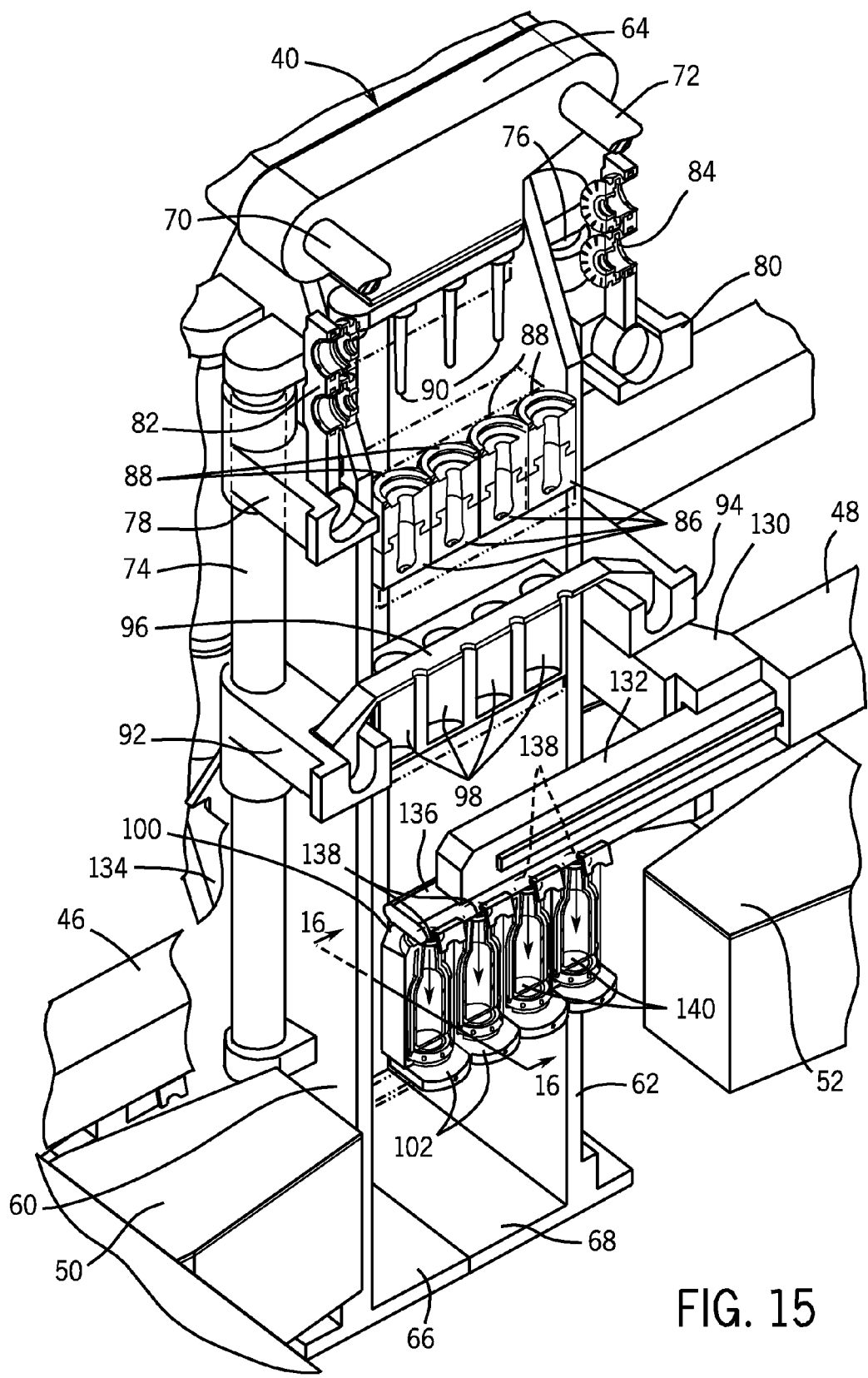
FIG. 15 is an isometric view of the half of the third section of the vertical I.S. machine shown in FIG. 14, with a blow head assembly on the right side having been advanced and the blow heads having been lowered from the blow head assembly onto the parison's finishes, and with the parisons having been blown into glass containers in the blow molds.

Referring then to FIG. 15, the operation of the blow head support member 48 to blow the parisons 120 in the blow molds consisting of the blow molds 100 and the parisons 120 will be described. It must first be understood that the construction and operation of the blow head support members 46 and the various components associated therewith is identical to the blow head support member 48 and the various components associated therewith. The blow head support members 46 and 48 operate alternately, since their operation includes cooling the blown glass containers and would otherwise limit the speed of operation of the vertical I.S. machine.

The blow head support member 48, which is mounted onto the section frame member 62 with a blow head mounting member 130, operates a blow head support arm 132 that moves between a retracted position (as shown in FIG. 14) and an extended position (as shown in FIG. 15). (The blow head support member 46 is mounted onto the section frame member 60 with a blow head mounting member 134.) Located under the blow head support arm 132 is a blow head operating member 136 that operatively supports four blow heads 138, one of which is shown in the enlarged partial end view of FIG. 16. The four blow heads 138 are each simultaneously, selectively driven by the blow head operating member 136 between a raised position and a lowered position.

Figure 16:
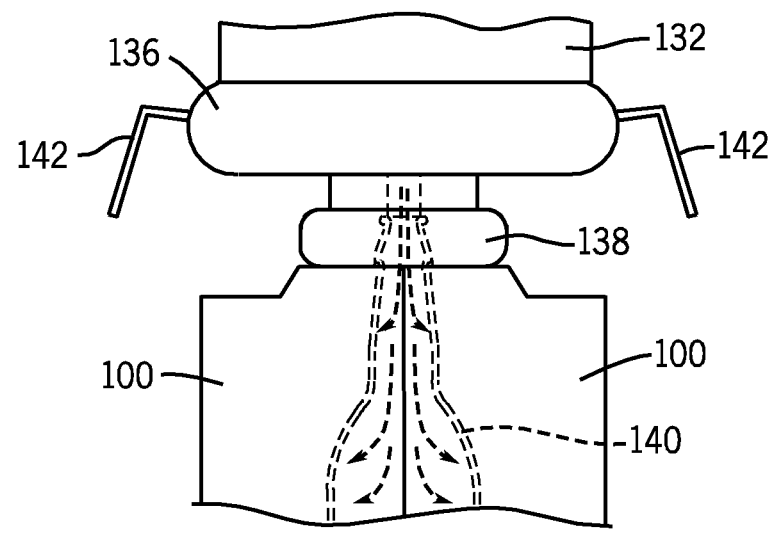
FIG. 16 is an enlarged partial end view of the blow head assembly shown in FIG. 15, showing one of the blow heads lowered onto the finish of the parison in the blow mold blowing the parison contained in the blow mold into a glass container.

Thus, in FIG. 15, the blow head support arm 132 is in its extended position, placing the four blow heads 138 over the four parisons 120 in the four blow molds. Subsequently, the four blow heads 138 are driven from their raised positions into their lowered positions on the finishes of the four parisons 120. Air is then supplied to the four blow heads 138 to blow the parisons 120 into four blown glass containers 140, as shown in FIGS. 15 and 16.

Figure 18:
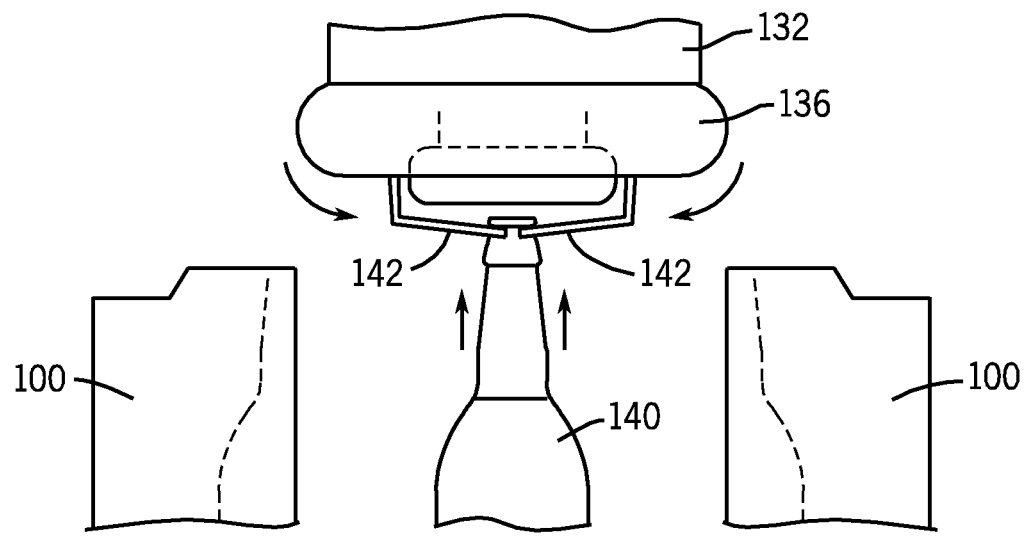
FIG. 18 is an enlarged partial end view of the blow head assembly shown in FIG. 17, with the blow heads having been raised, the blow head tongs gripping the finishes of the glass containers, and with the blow molds having been retracted.
Figure 17:
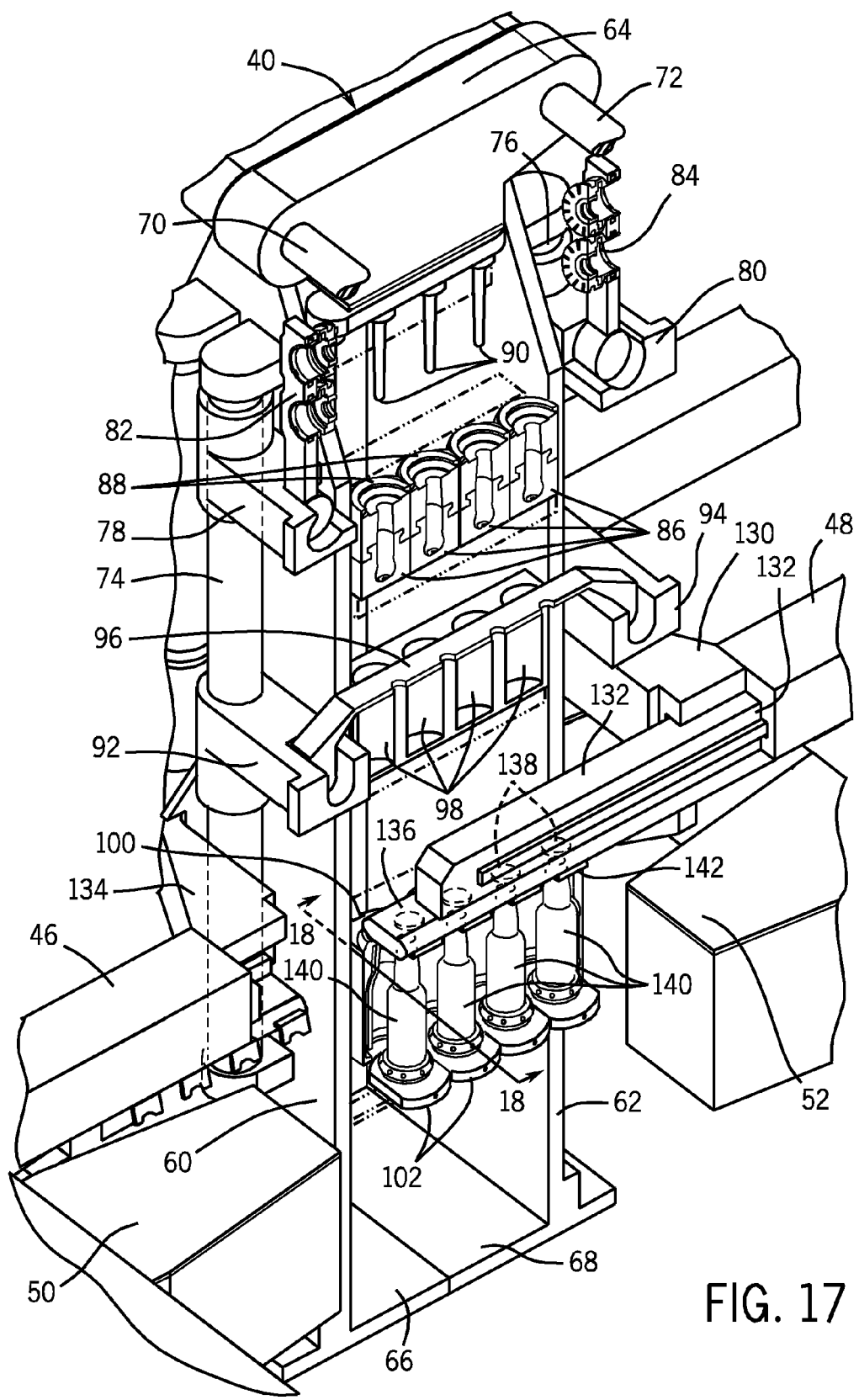
FIG. 17 is an isometric view of the half of the third section of the vertical I.S. machine shown in FIG. 15, with the blow heads having been raised, the blow head tongs gripping the finishes of the glass containers, and with the blow mold halves being in their retracted (open) positions.

Referring now to FIGS. 17 and 18, the four blow heads 138 are driven from their lowered positions into their raised positions above the finishes of the four blown glass containers 140 (where they may continue to blow air to cool the four newly blown glass containers 140. The blow molds 100 are driven from their extended positions into their retracted positions, exposing the blown glass containers 140. Pairs of opposed takeout tongs 142 then are lowered to grasp the finishes of the four blown glass containers 140 and raise the four blown glass containers 140 slightly.

Figure 19:
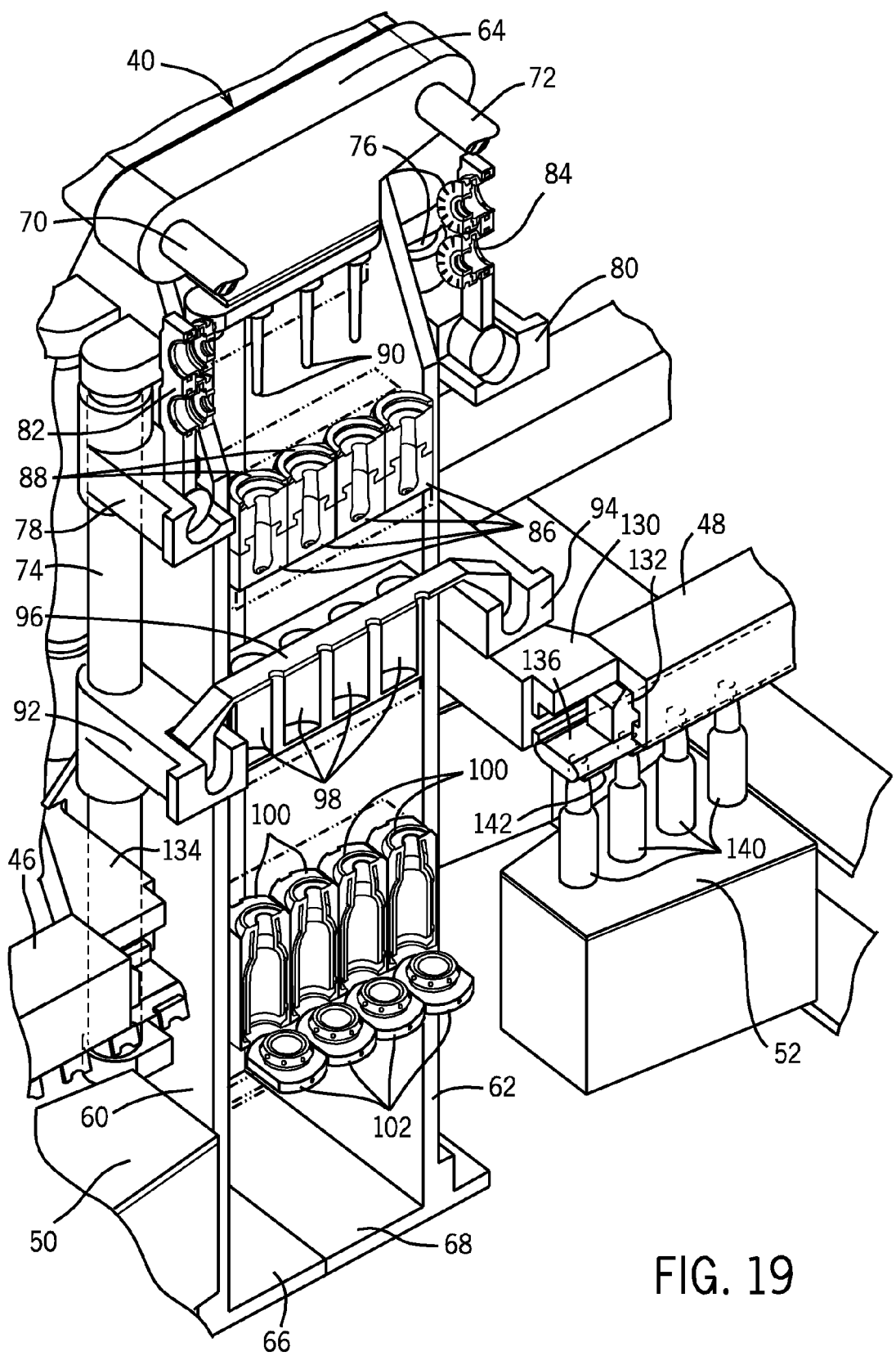
FIG. 19 is an isometric view of the half of the third section of the vertical I.S. machine shown in FIG. 17, with the blow head assembly having raised the blow head tongs and the glass containers and the blow head assembly having been retracted to an intermediate position while continuing to cool the glass containers.

Referring next to FIG. 19, it may be seen that the blow head support arm 132 has been driven from its extended position to its retracted position, carrying the four blown glass containers 140 to positions a slight distance above the deadplate 52. Air continues to be blown from the four blow heads 138 onto the four blown glass containers 140 to cool them.

Figure 20:
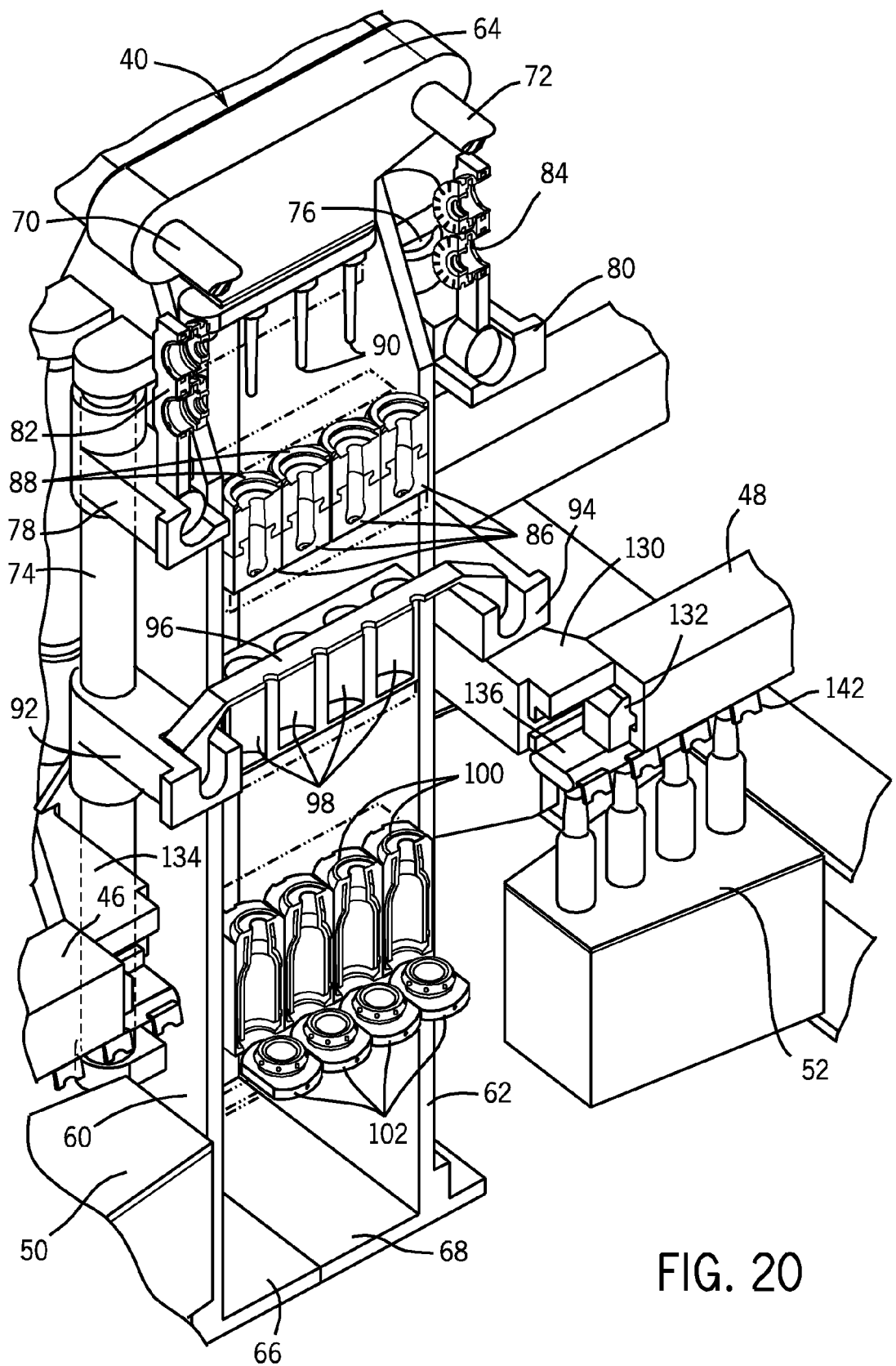
FIG. 20 is an isometric view of the half of the third section of the vertical I.S. machine shown in FIG. 19, with the blow head tongs having lowered and released the blown container onto a deadplate, and with the blow head tongs then having been raised.
Figure 21:
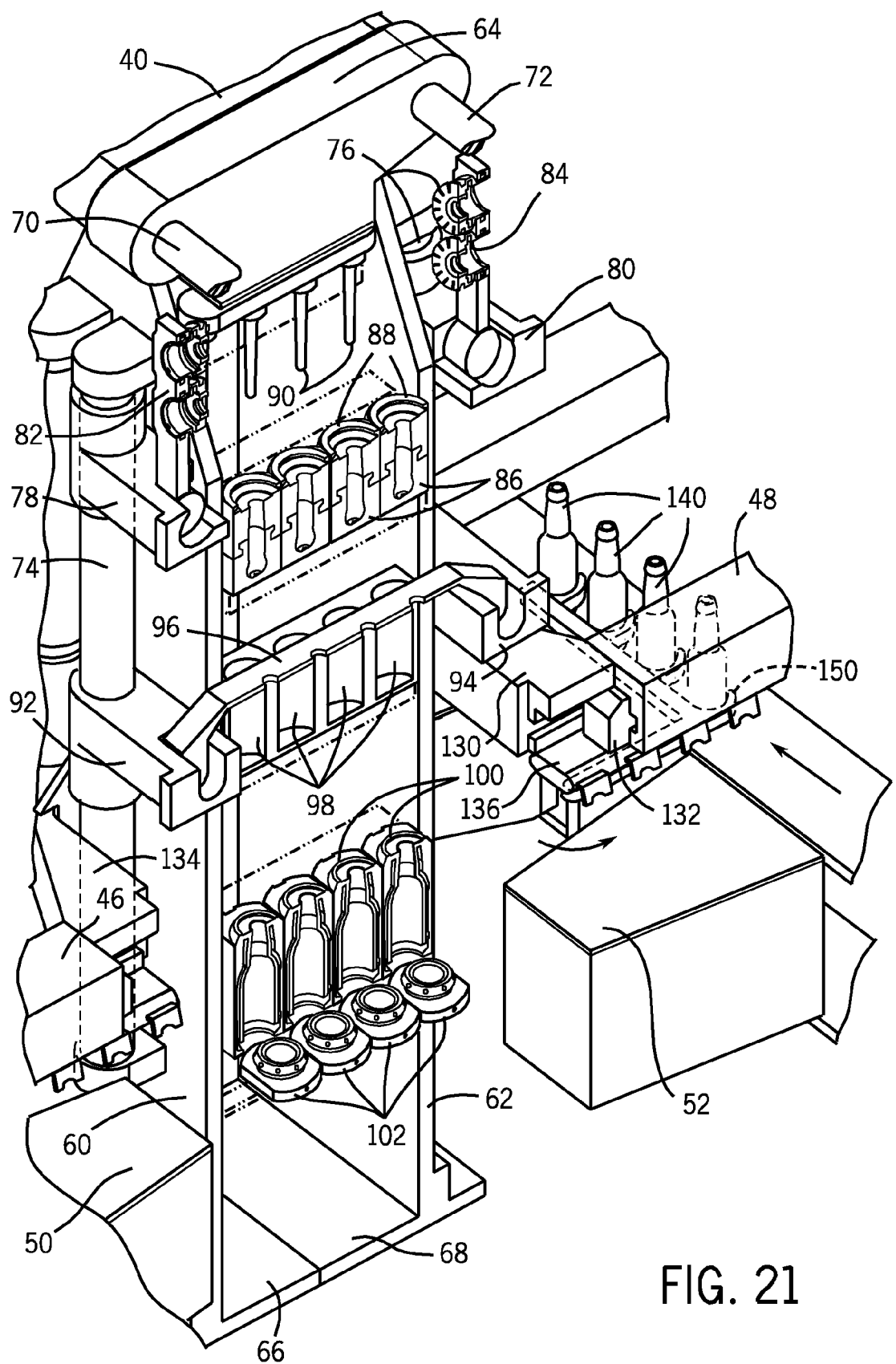
FIG. 21 is an isometric view of the half of the third section of the vertical I.S. machine shown in FIG. 20, with the pusher arm having moved the cooled, glass containers onto a conveyor belt which conveys the cooled, glass containers away.

Referring now to FIG. 20, the pairs of takeout tongs 142 lower the four blown glass containers 140 and drop them onto the deadplate 52. Referring finally to FIG. 21, a pusher arm 150 sweeps the four blown glass containers 140 onto the conveyor 56, which conveys them away from the vertical I.S. machine. (A pusher arm 152 is located near the deadplate 50 and sweeps blown glass containers from that deadplate 50 onto the conveyor 54, which conveys them away from the vertical I.S. machine.)

It may therefore be appreciated from the above detailed description of the preferred embodiment of the present invention that it teaches a vertical I.S. machine which eliminates the need to invert the parisons between the blank molds and the blow molds. The vertical I.S. machine of the present invention also reduces the footprint of I.S. machines to a smaller area for a variety of reasons. These advantages are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A vertical I.S. machine, comprising:
   at least one blank mold;
   a gob delivery mechanism for delivering a gob of molten glass to the at least one blank mold;
   at least one plunger for removable insertion into the at least one blank mold to form a parison in the at least one blank mold;
   at least one blow mold located vertically below the at least one blank mold;
   a transfer mechanism to lower the parison formed in the at least one blank mold to convey it to the at least one blow mold;
   a blow head for removable placement onto the at least one blow mold to blow the parison into a glass container; and
   a takeout mechanism to remove the glass container from the blow mold.

2. A vertical I.S. machine as defined in claim 1, wherein the vertical I.S. machine comprises a section having multiple blank molds, multiple plungers, multiple blow molds, and multiple blow heads, each of which blank molds, plungers, blow molds, and blow heads in the section are arranged and configured to operate simultaneously, wherein the gob delivery mechanism simultaneously delivers gobs of molten glass to the blank molds in the section, wherein the transfer mechanism simultaneously lowers the parisons formed in the blank molds in the section to respectively convey them to the blow molds in the section, and wherein the takeout mechanism simultaneously remove the glass containers from their respective blow molds.

3. A vertical I.S. machine as defined in claim 2, wherein the vertical I.S. machine comprises a plurality of identical sections that are located close adjacent to each other.

4. A vertical I.S. machine as defined in claim 1, wherein the at least one blank mold comprises:
   a pair of blank mold halves each being extendable to bring the blank mold halves together to form the at least one blank mold in which the parison is formed and retractable to space the blank mold halves away from each other to facilitate the transfer mechanism as it lowers the parison from a position intermediate the blank mold halves when they are retracted.

5. A vertical I.S. machine as defined in claim 4, wherein each blank mold half comprises a bottom blank mold half and a top blank mold half, wherein the bottom blank mold halves are configured to be extended to bring the bottom blank mold halves together to receive the gob of molten glass prior to the top blank mold halves being extended to bring the top blank mold halves together.

6. A vertical I.S. machine as defined in claim 1, wherein the transfer mechanism comprises:
   a pair of opposed transfer mechanism halves each being arranged and configured to be extended to engage a parison formed in the at least one blank mold, lowered to convey the parison formed in the at least one blank mold to the at least one blow mold, retracted to release the parison formed in the at least one blank mold in the at least one blow mold, and returned to a position adjacent the at least one blank mold.

7. A vertical I.S. machine as defined in claim 1, additionally comprising:
   at least one reheat shroud located below the at least one blank mold and above the at least one blow mold;
   wherein the transfer mechanism comprises:
   a first transfer mechanism to lower the parison formed in the at least one blank mold to the at least one reheat shroud; and
   a second transfer mechanism to lower the parison from the at least one reheat shroud to convey it to the at least one blow mold.

8. A vertical I.S. machine as defined in claim 7, wherein the first transfer mechanism comprises:
   a pair of opposed first transfer mechanism halves each being arranged and configured to be extended to engage a parison formed in the at least one blank mold, lowered to convey the parison formed in the at least one blank mold to the at least one reheat shroud, retracted to release the parison formed in the at least one blank mold in the at least one reheat shroud, and returned to a position adjacent the at least one blank mold; and
   wherein the second transfer mechanism comprises:
   a pair of opposed second transfer mechanism halves each being arranged and configured to be extended to engage a parison reheated in the at least one reheat shroud, lowered to convey the parison reheated in the at least one reheat shroud to the at least one blow mold, retracted to release the parison formed in the at least one blank mold in the at least one blow mold, and returned to a position adjacent the at least one blank mold.

9. A vertical I.S. machine as defined in claim 7, wherein the at least one reheat shroud comprises:
   a pair of reheat shroud halves each being extendable to bring the mold halves together to form the at least one reheat shroud in which the parison is reheated and retractable to space the reheat shroud halves away from each other to facilitate the first transfer mechanism as it lowers the parison from a position intermediate the mold halves when they are retracted.

10. A vertical I.S. machine as defined in claim 1, wherein the at least one blow mold comprises:
    a pair of blow mold halves each being extendable to bring the blow mold halves together to form the at least one blow mold in which the parison is blown into a glass container and retractable to space the blow mold halves away from each other to facilitate the takeout mechanism as it removes the glass container from a position intermediate the blow mold halves when they are retracted.

11. A vertical I.S. machine as defined in claim 10, wherein the at least one blow mold comprises:
    a bottom plate, wherein the pair of blow mold halves engage the bottom plate at their respective bottoms thereof to form the at least one blow mold.

12. A vertical I.S. machine as defined in claim 1, wherein additionally comprising:
    a blow head support assembly;
    a blow head support arm that is arranged and configured to be extendible to an extended position over the at least one blow mold and retractable to a retracted position over a deadplate and away from the at least one blow head, the blow head support arm also being arranged and configured to have a raised position and a lowered position; and
    at least one blow head mounted under the blow head support arm that is arranged and configured to blow a parison in the at least one blow mold when the blow head support arm has been extended to the extended position and lowered to the lowered position.

13. A vertical I.S. machine as defined in claim 12, wherein the takeout mechanism comprises:
    at least one pair of takeout tongs that is arranged and configured to have a retracted position and an engaged position for engaging a blown glass container to facilitate its removal to the deadplate.

14. A vertical I.S. machine, comprising:
    at least one blank mold;
    a gob delivery mechanism for delivering a gob of molten glass to the at least one blank mold;
    at least one plunger for removable insertion into the at least one blank mold to form a parison in the at least one blank mold from the gob of molten glass;
    at least one reheat shroud located below the at least one blank mold;
    a first transfer mechanism to lower the parison formed in the at least one blank mold to the at least one reheat shroud;
    at least one blow mold located below the at least one reheat shroud;
    a second transfer mechanism to lower the parison from the at least one reheat shroud to convey it to the at least one blow mold;
    a blow head for removable placement onto the at least one blow mold to blow the parison into a glass container; and
    a takeout mechanism to remove the glass container from the blow mold.

15. A vertical I.S. machine, comprising:
    a blank mold;
    a gob delivery mechanism for delivering a gob of molten glass to the blank mold;
    a plunger arranged and configured to form a parison in the blank mold;
    a blow mold located vertically below the blank mold;
    a transfer mechanism to lower the parison formed in the blank mold vertically to the blow mold;
    a blow head to blow the parison into a glass container in the blow mold; and
    a takeout mechanism to remove the glass container from the blow mold.

16. A method of operating a vertical I.S. machine, comprising:
    delivering a gob of molten glass to at least one blank mold;
    removably inserting a plunger into the at least one blank mold to form a parison in the at least one blank mold from the gob of molten glass;
    lowering the parison formed in the at least one blank mold vertically into at least one blow mold located below the at least one blank mold;
    blowing the parison into a glass container with a blow head removably placed onto the at least one blow mold; and removing the glass container from the blow mold with a takeout mechanism.

17. A method as defined in claim 16, additionally comprising:
    extending a pair of blank mold halves to bring them together to form the at least one blank mold in which the parison is formed prior to the removably inserting step; and
    retracting the pair of blank mold halves to space them away from each other to facilitate the lowering step which occurs after the blank mold halves are retracted.

18. A method as defined in claim 16, wherein the lowering step comprises:
    lowering the parison formed in the at least one blank mold to at least one reheat shroud;
    reheating the parison in the at least one reheat shroud; and
    lowering the parison from the at least one reheat shroud to convey it to the at least one blow mold.

19. A method as defined in claim 18, wherein the reheating step comprises:
    extending a pair of reheat shroud halves to bring them together to form the at least one reheat shroud in which the parison is reheated; and
    retracting the pair of reheat shroud halves away from each other to facilitate lowering the parison from the at least one reheat shroud to convey it to the at least one blow mold.

20. A method as defined in claim 16, wherein the blowing step comprises:
    extending a pair of blow mold halves to bring them together to form the at least one blow mold in which the glass container is blown prior to the blowing step; and
    retracting the pair of blow mold halves to space them away from each other to facilitate the removing step which occurs after the glass container is blown.

21. A method as defined in claim 20, wherein the blowing step additionally comprises:
    providing a bottom plate that is engaged by the bottoms of the blow mold halves when they are extended to form the at least one blow mold.

* * * * *